United States Patent [19]

Fukamachi et al.

[11] Patent Number: 5,213,651
[45] Date of Patent: May 25, 1993

[54] TIRE BUILDING METHOD AND APPARATUS

[75] Inventors: Yoshihiro Fukamachi; Shigeru Tada; Koji Okuyama, all of Kodaira, Japan

[73] Assignee: Bridgestone Corporation, Tokyo, Japan

[21] Appl. No.: 571,695

[22] Filed: Aug. 24, 1990

[30] Foreign Application Priority Data

Aug. 24, 1989 [JP] Japan .................................. 1-217979
Aug. 24, 1989 [JP] Japan .................................. 1-217980

[51] Int. Cl.[5] ............................................. B29D 30/20
[52] U.S. Cl. ................................ 156/406.2; 156/396; 156/126; 156/111
[58] Field of Search ............... 156/111, 123, 126, 127, 156/128.1, 133, 394.1, 396, 405.1, 406, 406.2; 901/1, 6

[56] References Cited

U.S. PATENT DOCUMENTS

| | | | |
|---|---|---|---|
| 1,964,363 | 6/1934 | Ostling et al. | 156/396 X |
| 3,909,335 | 9/1975 | Jellison | 156/414 |
| 4,105,487 | 8/1978 | Suzuki et al. | 156/126 |
| 4,437,920 | 3/1984 | Kubo | 156/406.2 |
| 4,584,049 | 4/1986 | Mukae et al. | 156/126 |
| 4,584,050 | 4/1986 | Kumagai et al. | 156/126 X |
| 4,985,100 | 1/1991 | Sasaki et al. | 156/123 X |

Primary Examiner—Michael W. Ball
Assistant Examiner—Francis J. Lorin
Attorney, Agent, or Firm—Sughrue, Mion, Zinn, Macpeak & Seas

[57] ABSTRACT

An apparatus for building tires includes belt ply supply devices, first and second tread supply devices, first and second band forming drums rotatable and expansible and contractible, a taking-out device for alternately removing formed bands from the band forming drums, a first moving device for successively moving the first forming drum to the supply positions of the respective belt ply supply devices and the first tread supply device and a taking-out position of the taking-out device to successively wind belt plies and a tread around the first band forming drum and to remove a formed band from the first band forming drum, and second moving device for successively moving the second band forming drum to the supply positions of the respective belt ply supply devices and the second tread supply device and the taking-out position of the taking-out device to successively wind belt plies and a tread around the second band forming drum and to remove a formed band from the second band forming drum. The apparatus is operated so that the winding of the belt plies and the tread around one band forming drum and the removal of the band from the other band forming drum are performed simultaneously.

12 Claims, 16 Drawing Sheets

FIG_1
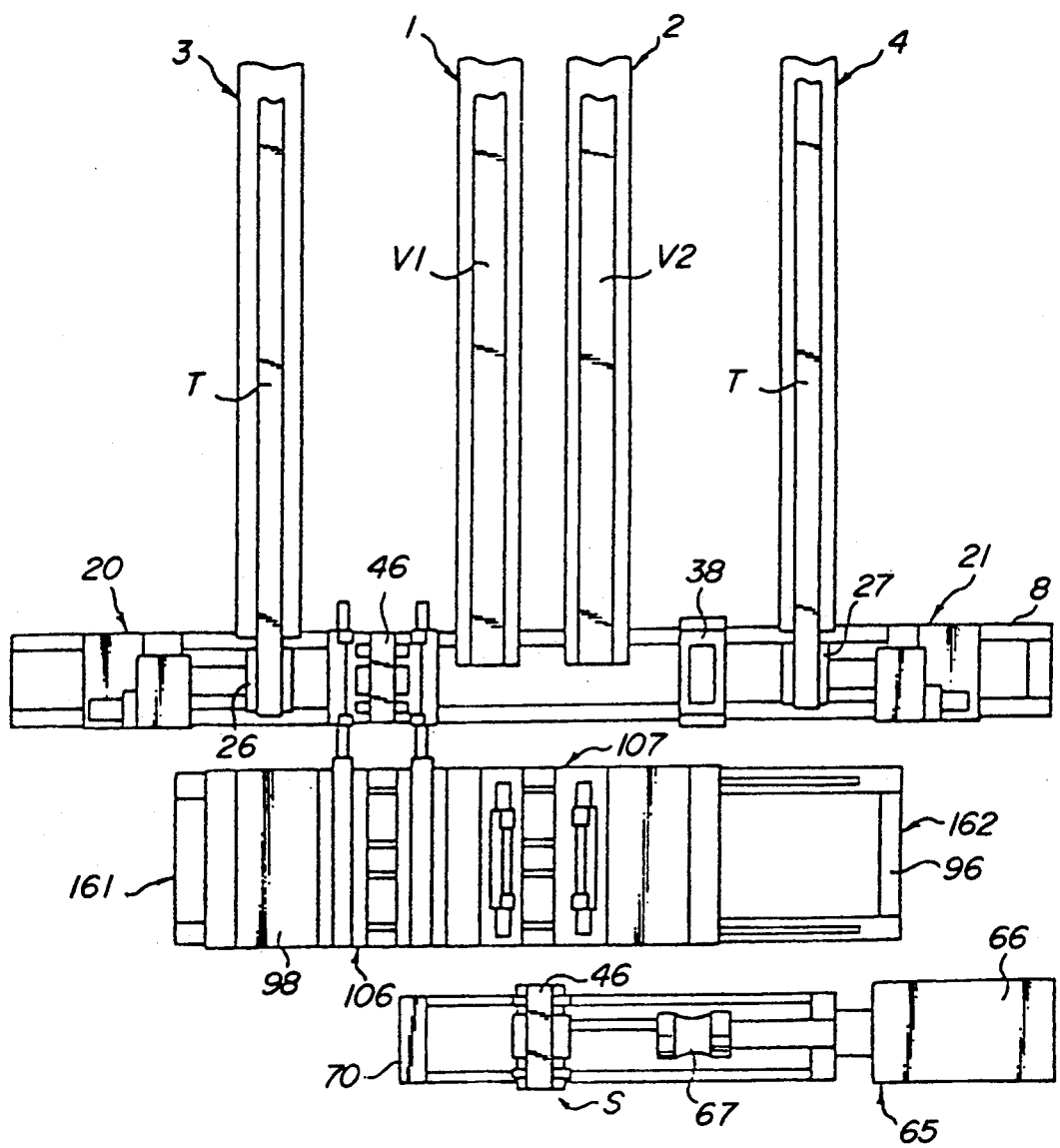

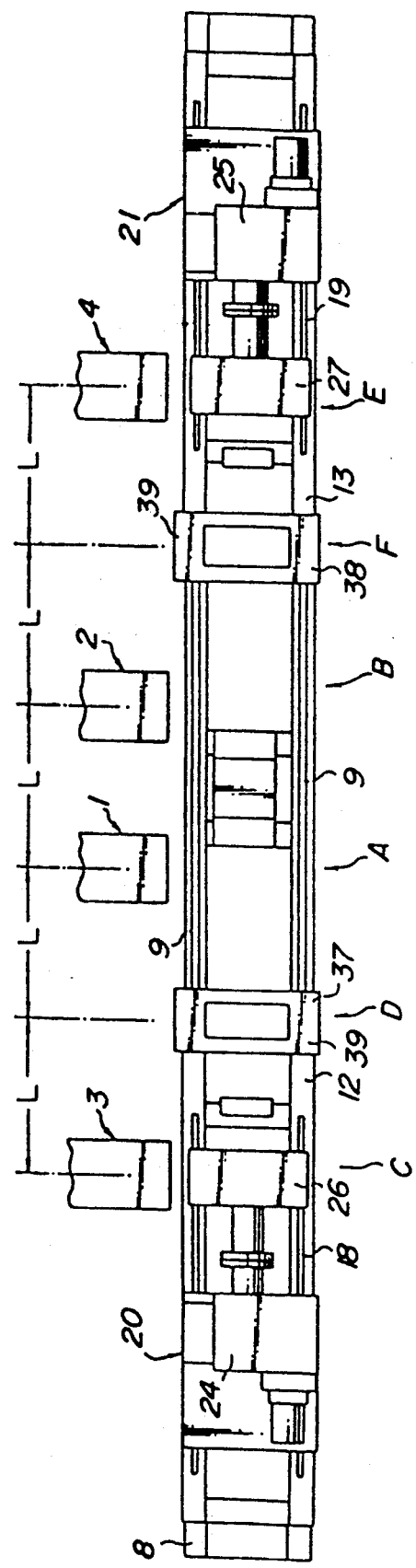
FIG._2
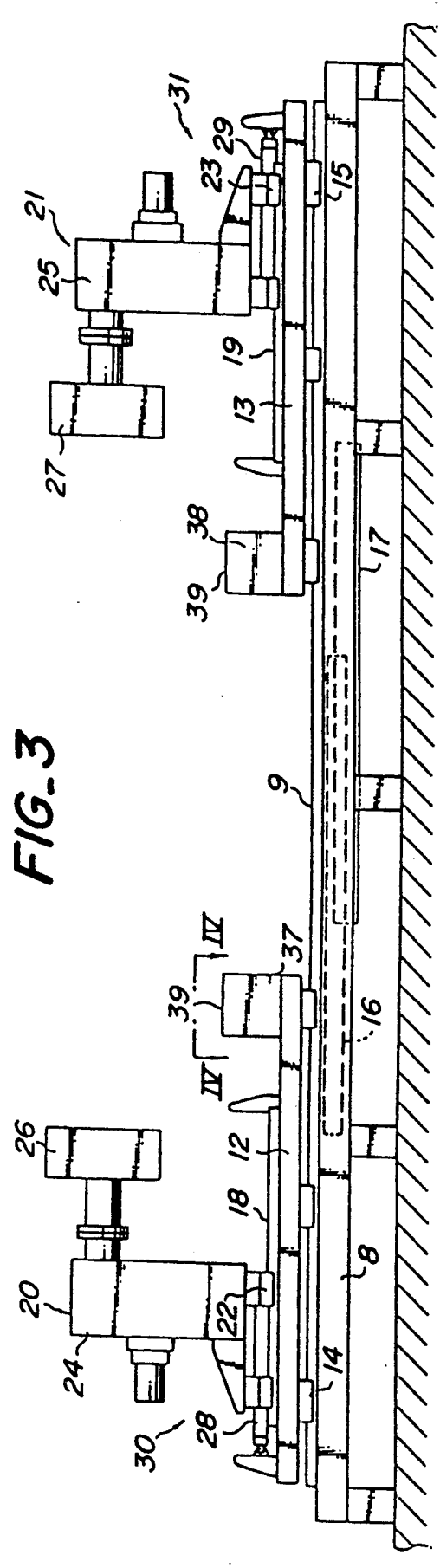
FIG._3

FIG_4
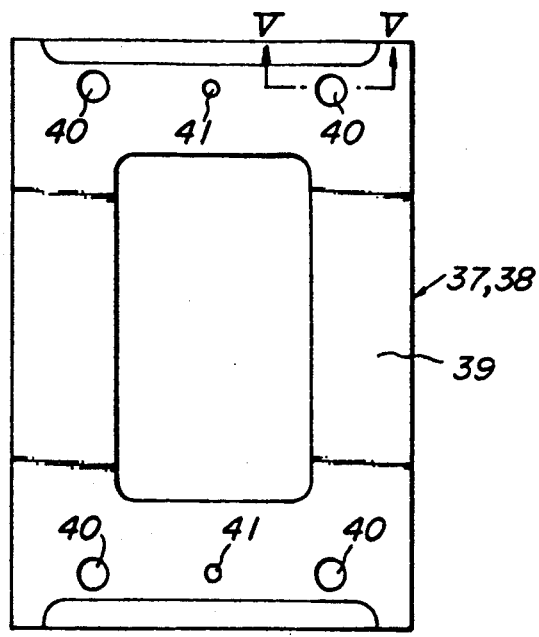
FIG_5
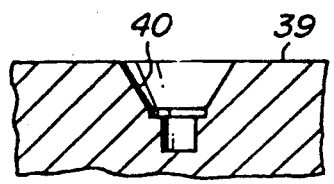

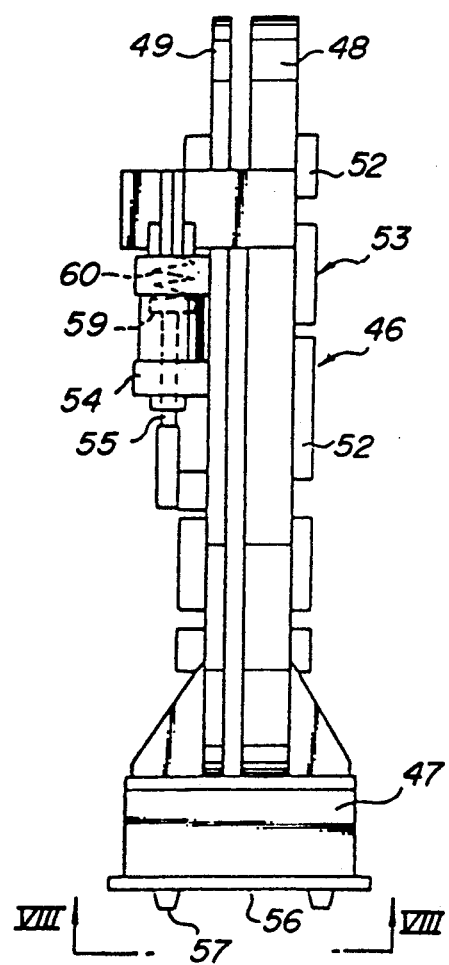
FIG_6

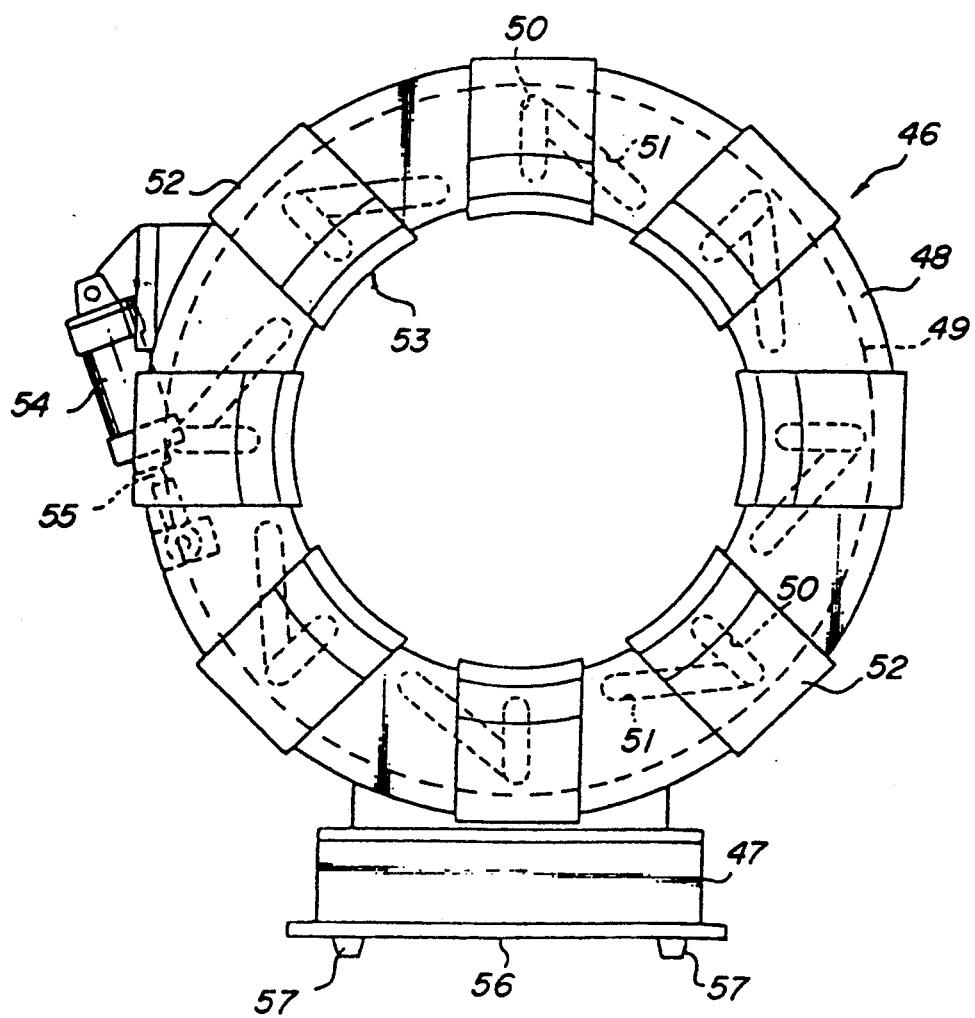
FIG_7

FIG_8
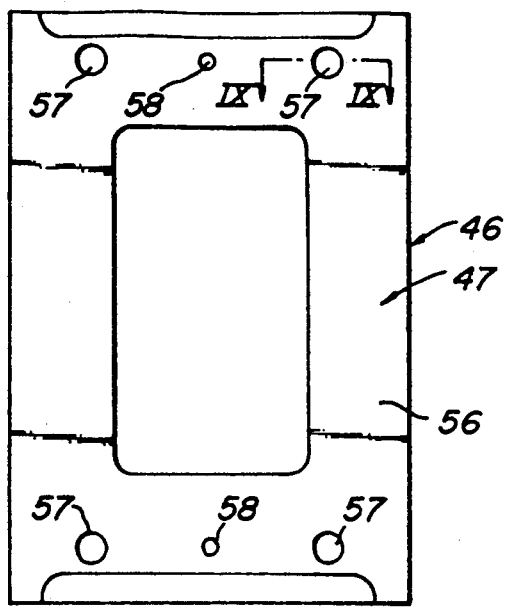
FIG_9
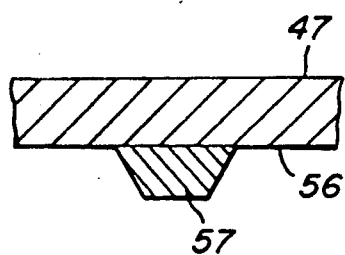

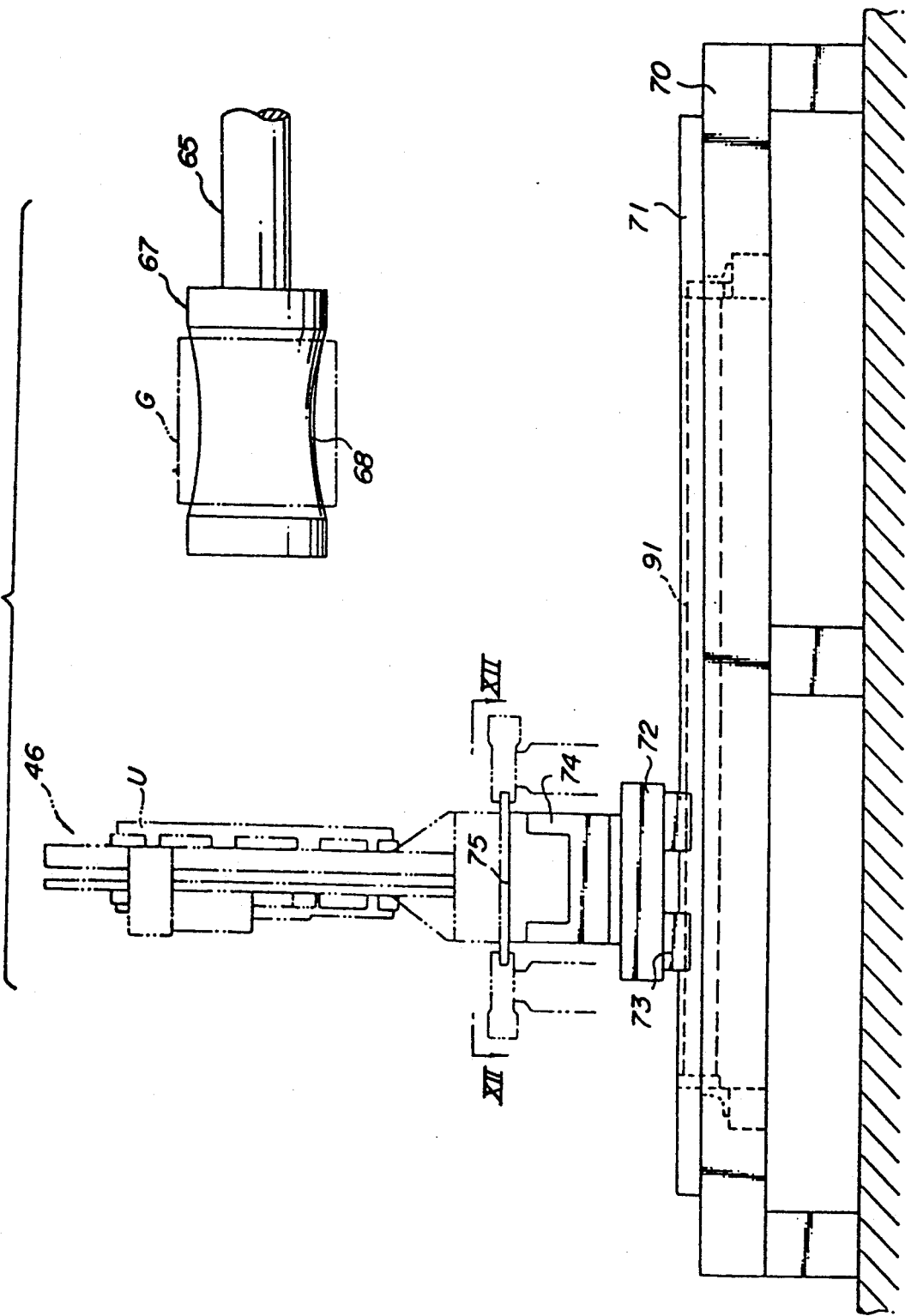

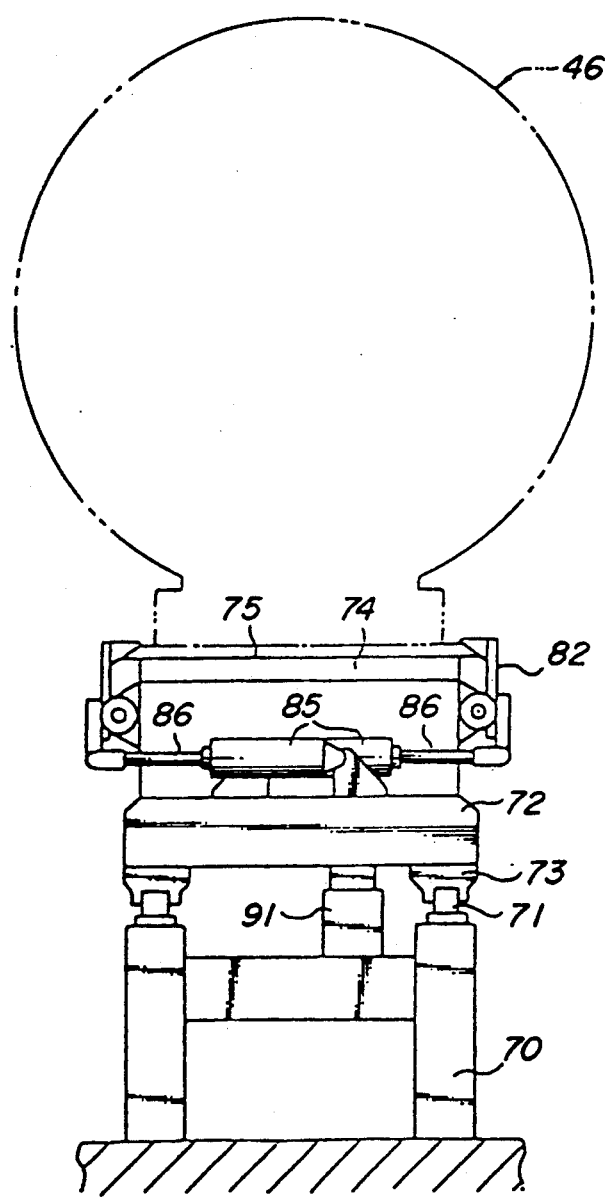
FIG_11

FIG_14

FIG_15

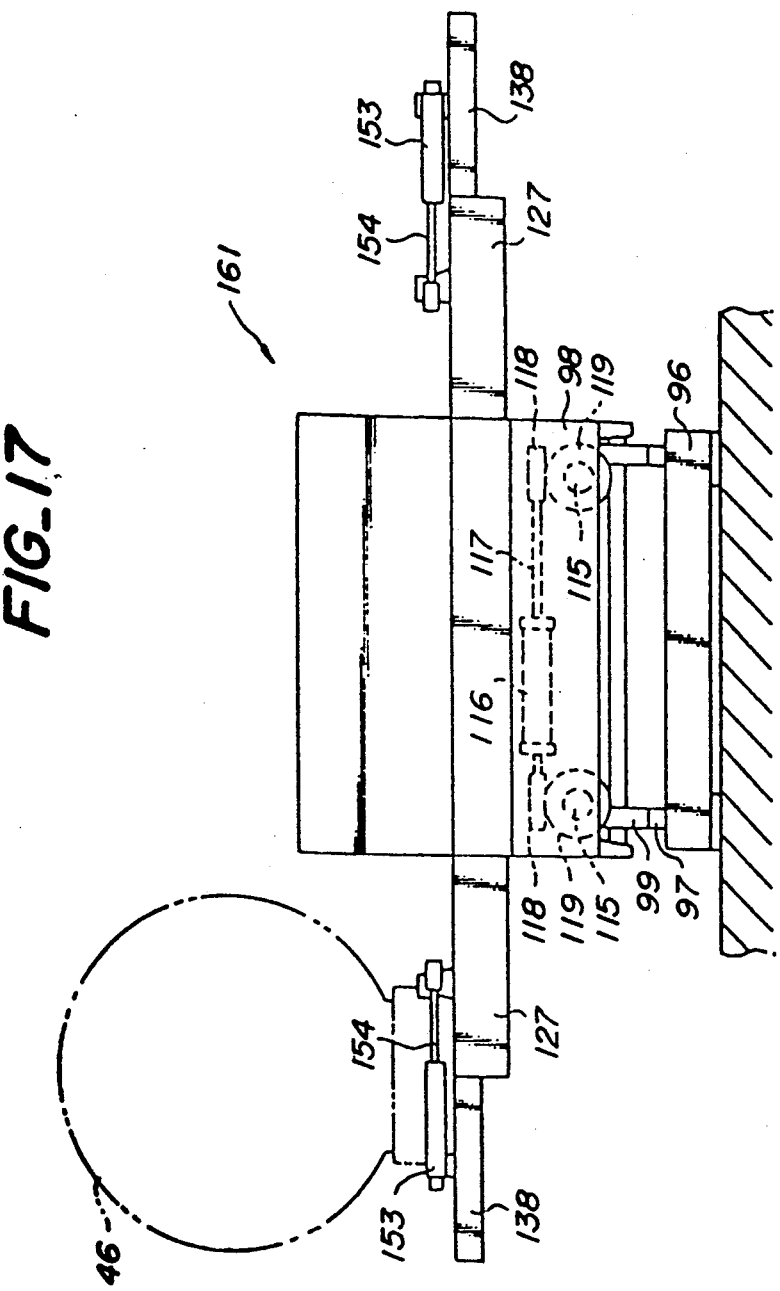

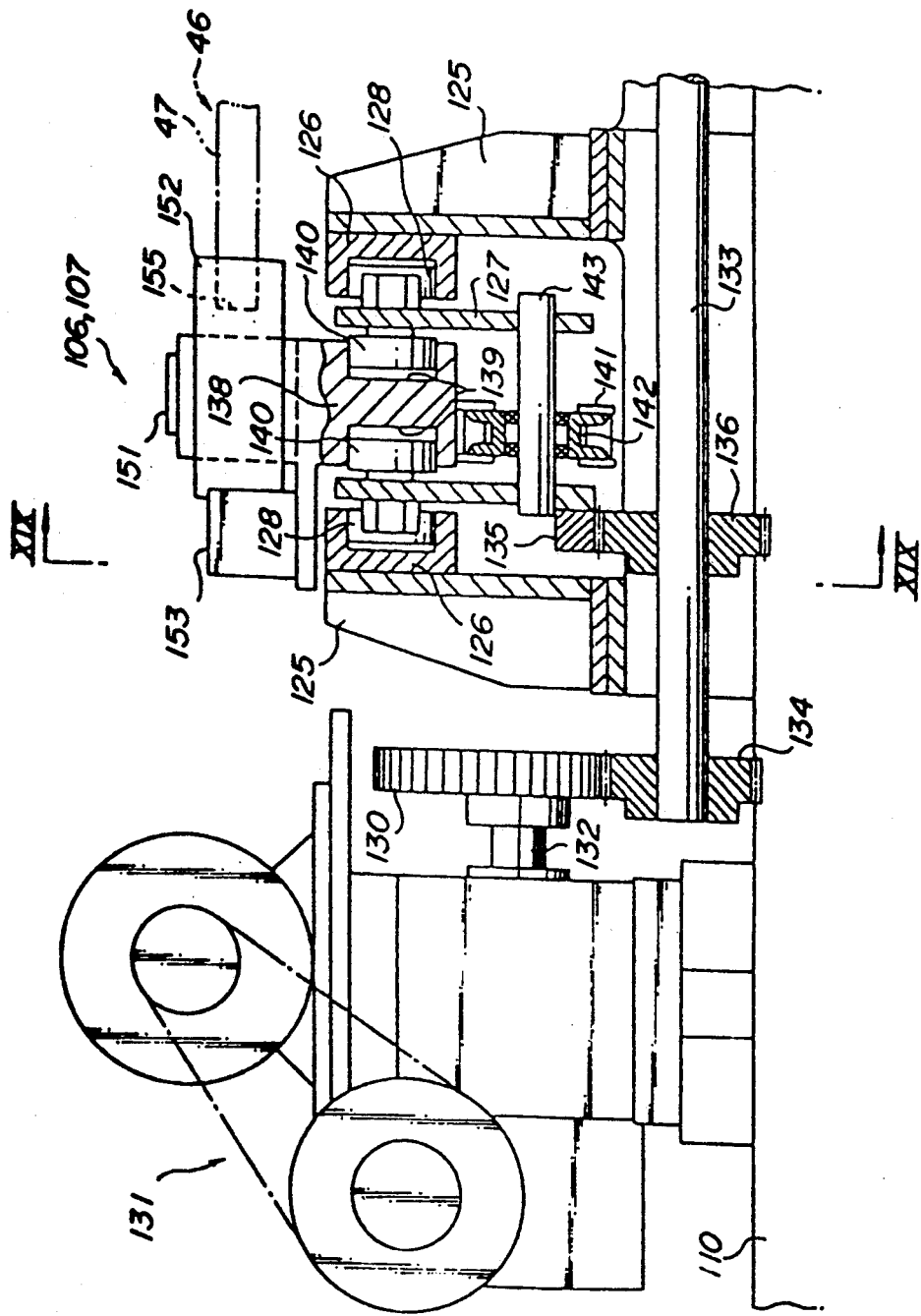

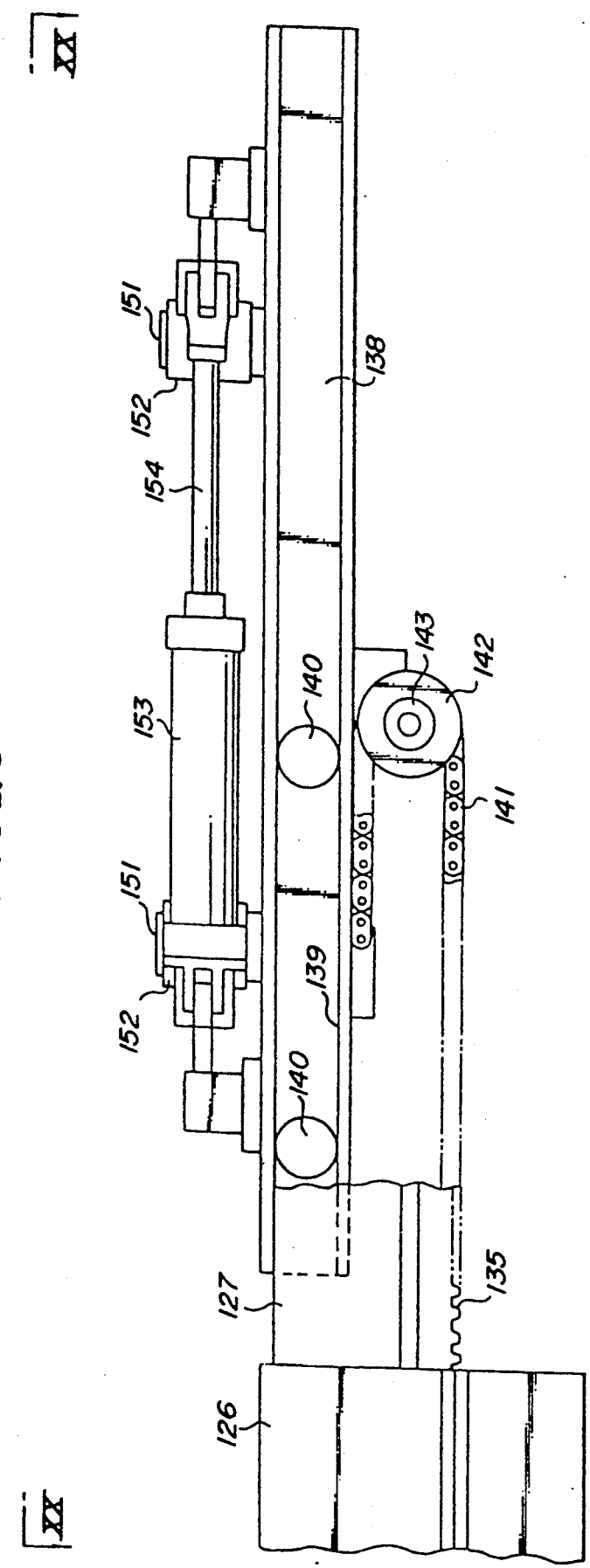

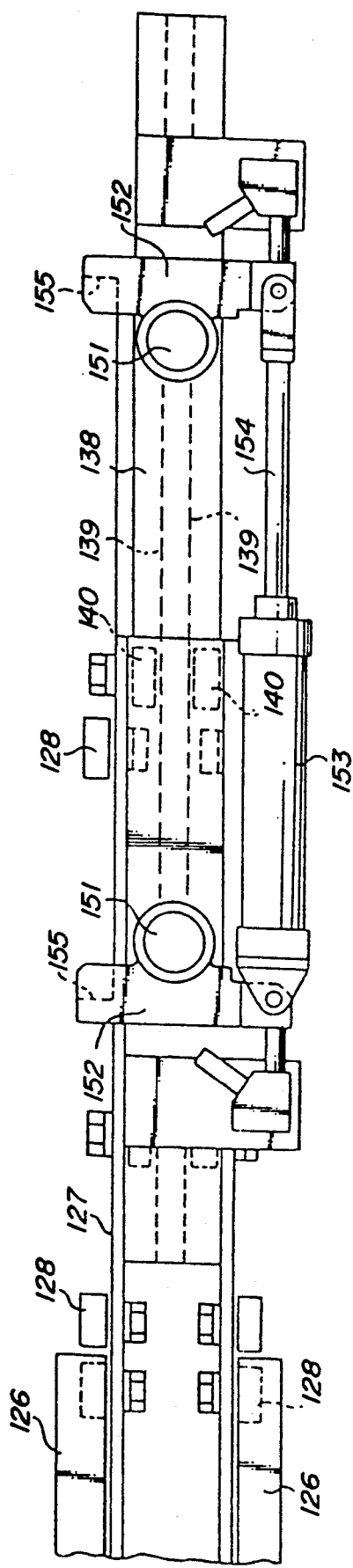
FIG_20

TIRE BUILDING METHOD AND APPARATUS

BACKGROUND OF THE INVENTION

1. Field of the Invention

This invention relates to a method of, and an apparatus for building green tires by forming a band consisting of belt plies and a tread and then combining the formed band with a green case to form a green tire. More particularly it relates to a transfer apparatus for transferring cylindrical members such as belts, tread bands and the like in tire producing processes from one forming drum to another forming drum.

2. Description of Related Art

Tire building apparatus for building green tires have been known. For example, there is known one type of apparatus which includes one band forming drum, a plurality of belt ply supply means arranged one above the other on one side of the band forming drum for supplying belt plies of different kinds, and one tread supply means arranged above the belt ply supply means for supplying treads to the band forming drum. The apparatus further includes one taking-out device for removing from the band forming drum a band formed by successively winding the belt plies and a tread supplied to the band forming drum and for transferring the removed band, and a tire forming drum on which a green case is combined with the band transferred by the taking-out means to form a green tire.

In forming a green tire by the use of such an apparatus, first the belt plies of the different kinds are successively supplied from the belt ply supply means onto the band forming drum, while it is being rotated so that the belt plies are wound around the band forming drum. Thereafter, the tread is supplied from the tread supply mean and wound over the belt plies on the band forming drum to form a band. The formed band is then removed from the band forming drum by means of the taking-out device and transferred to the tire forming drum. In this case, since a green case has been previously fitted on the tire forming drum, the green case and the band are combined on the tire forming drum to form a green tire.

With such method and apparatus for building tires, as one set of belt ply supply means and one tread supply means are arranged for one band forming drum, there is a problem in that the apparatus is complicated in construction and large-sized.

Transfer apparatus for transferring cylindrical members between expansible and contractible forming drums have been known. For example, known transfer apparatus includes rails arranged between both the forming drums, and a transfer member having a ring member on its upper portion and slidably movable on the rails toward and away from the forming drums. The ring member has a chuck capable of expanding and contracting to grasp the cylindrical member on its outside. In transferring the cylindrical member with such a transfer apparatus, first the transfer member is moved toward one forming drum so that the ring member is loosely fitted on the forming drum. Thereafter, the chuck is contracted to reduce its diameter so that the cylindrical member on the forming drum is grasped on its outside by the chuck, while the one forming drum is contracted to reduce its diameter and the transfer member is then moved toward the other forming drum so that the ring member is loosely fitted on the forming drum. The other forming drum is then expanded to increase its diameter to support the cylindrical member on its inside, while the chuck is expanded to increase its diameter to release the cylindrical member, thereby transferring the cylindrical member from the transfer member to the other forming drum.

Such a transfer apparatus makes it possible to readily transfer cylindrical members in the case wherein the forming drums are coaxial with each other or there is no obstruction between the forming drums. However, in the event that, for example, the forming drums are not coaxial with each other or axes of the forming drum are in parallel with but spaced from each other or any stationary member is provided between the coaxial forming drums, the mid portions of the rails are necessarily curved in a complicated manner in order to accomplish the transfer of the relevant member between the forming drums. As a result, however, the heavy transfer member must be moved along the complicated passage so that the entire installation becomes bulky and the transfer of the member takes much time thereby lowering the operation efficiency.

SUMMARY OF THE INVENTION

It is a primary object of the invention to provide an improved method and an apparatus for building tires, which makes it possible to form bands with high efficiency and which is simple in construction and small-sized.

In order to accomplish this object, the method of building tires according to the invention comprises: a first belt ply winding step of successively winding belt plies supplied from a plurality of belt ply supply means around a first band forming drum, while the first band forming drum is successively moved to the supply positions of the belt ply supply means; a second belt ply winding step of successively winding belt plies supplied from the belt ply supply means around a second band forming drum, while the second band forming drum is successively moved to the supply positions of the belt ply supply means; a first tread winding step of winding a tread supplied from first tread supply means around the belt plies wound on the first band forming drum to form a band by moving the first band forming drum to a supply position of the first tread supply means; a second tread winding step of winding a tread supplied from second tread supply means around the belt plies wound on the second band forming drum to form a band by moving the second band forming drum to a supply position of the second tread supply means; a first band taking-out step of removing the formed band from the first band forming drum; and a second band taking-out step of removing the formed band from the second band forming drum; the first belt ply winding and first tread winding steps and the second band taking-out step being performed simultaneously, and the second belt ply winding and second tread winding steps and the first band taking-out step being performed simultaneously.

In another aspect, the apparatus for building tires according to the invention comprises a plurality of belt ply supply means for supplying belt plies, respectively; first and second tread supply means for supplying treads, respectively; first and second band forming drums rotatable and expansible to increase diameters and contractible to decrease diameters; taking-out means for alternately removing formed bands from the first and second band forming drums; first moving means for successively moving the first band forming drum to the supply positions of the respective belt ply supply means, a supply position of the first tread supply means and a taking-out position of the taking-out means to successively wind belt plies supplied from said belt ply supply means and a tread supplied from said first tread supply means one over the other around the first band forming drum at the respective supply positions and to remove a formed band from the first band forming drum; and second moving means for successively moving the second band forming drum to the supply positions of the respective belt ply supply means, a supply position of the second tread supply means and the taking-out position of the taking-out means to successively wind belt plies supplied from said belt ply supply means and a tread supplied from said second tread supply means one over the other around the second band forming drum at the respective supply positions and to remove a formed band from the second band forming drum; the apparatus being so operated that winding the belt plies and the tread around the first band forming drum and removing the band from the second band forming drum are performed simultaneously and winding the belt plies and the tread around the second band forming drum and removing the band from the first band forming drum are performed simultaneously.

It is now assumed that the first band forming drum does not have any tire member wound therearound, while the second band forming drum has a band which has been formed thereon. The first moving means is then actuated to move the first band forming drum to the supply positions of the respective belt ply supply means where belt plies of different kinds supplied from the belt ply supply means are successively wound around the first band forming drum. Subsequently, the first band forming drum is moved by means of the first moving means to the supply position of the first tread supply means where a tread supplied from the first tread supply means is wound over the belt plies on the first band forming drum to form a band.

On the other hand, the second band forming drum is moved by means of the second moving means to the taking-out position where the formed band is removed from the second band forming drum by means of the taking-out means. As a result, the second band forming drum does not have any band. The formation of the band by winding the belt plies and the tread at the first band forming drum is performed simultaneously with the taking-out of the formed band at the second band forming drum.

Thereafter, the second moving means is actuated to move the second band forming drum to the supply positions of the belt ply supply means the same as those above described where belt plies of different kinds supplied from the belt ply supply means are successively wound around the second band forming drum. Subsequently, the second band forming drum is moved to the supply position of the second tread supply means by means of the second moving means where a tread supplied from the second tread supply means is wound over the belt plies on the second band forming drum.

On the other hand, the first band forming drum is moved to the taking-out position by means of the first moving means where the formed band is removed from the first band forming drum by means of the taking-out means. As a result, the first band forming drum does not have any tire member. Moreover, the formation of the band by winding the belt plies and the tread at the second band forming drum is performed simultaneously with the taking-out of the formed band at the first band forming drum.

As described above, the operation of forming the band at the first band forming drum is performed simultaneously with the operation of taking-out the formed band from the second forming drum and the operation of forming the band at the second band forming drum is performed simultaneously with the operation of taking-out the formed band from the first band forming drum. In this case, the word "simultaneously" includes of course the case wherein cycle times of the two operations are substantially equal and starting and finishing of the two operations are substantially at the same time. It further includes the case wherein the cycle times of the two operations are different and any operation starts or finishes earlier than the other operation does. That is, simultaneously refers to a period during which to proceed both the operations at the same time.

Thereafter, the cycles are repeated to form bands in succession, and the formed bands are alternately taken out from the first and second band forming drums. In the invention, the numerous belt ply supply devices are common to the two band forming drums in this manner so that the construction of the entire apparatus is simplified and small-sized. Moreover, exchange of plies can be easily effected when sizes of tire are changed.

Furthermore, even if any one of the band forming drums and the tread supply means encounters failure or trouble, the remaining band forming drum and tread supply devices can continue the band forming operations without being affected by such trouble. Consequently, there is no need for stopping the entire apparatus owing to the trouble of part of the apparatus. Although it may be considered to cause loss time in the case that the belt ply supply means are commonly used in the invention, the winding of the belt plies and the tread and taking-out of the band are simultaneously performed so that loss time can be prevented as effectively as possible without lowering the production efficiency.

Moreover, since the cycle time of the band forming and taking-out operations is about one half of the cycle time of the green tire forming by combining the band and the green case, it is advantageous that one tire forming drum is commonly provided for the two band forming drums. The formed bands are alternately taken out of the first and second band forming drums by means of the taking-out means and are transferred to the tire forming drum.

Furthermore, with the taking-out means according to the invention, even if the band forming drums and the tire forming drum are not coaxial or there is any obstruction between these forming drums, the bands can be transferred between the drums with high efficiency, keeping the accuracy of the bands, notwithstanding the small-sized and simply constructed apparatus according to the invention.

Moreover, the apparatus for building tires according to the invention comprises first and second band forming drums for successively winding belts and treads thereon to form bands, respectively, taking-out means for alternately removing formed bands from the first and second band forming drums and transferring the removed bands to a tire forming drum on which the band and a green case are combined to form a green tire. With this arrangement, it is possible to operate both the band forming drums having a long forming cycle time and the tire forming drum having a short forming cycle time with high efficiency or with less loss time. Further, even if any one of the band forming drums encounters failures or trouble, the operation can be continued without stopping the entire apparatus.

It is another object of the invention to provide a transfer apparatus capable of transferring cylindrical members between forming drums with high efficiency, keeping the accuracy of the members, notwithstanding the small-sized and simply constructed apparatus and even if the forming drums are not coaxial with each other or there is any obstruction between the forming drums.

In order to accomplish this object, the invention provides a apparatus for transferring cylindrical members from one forming drum to the other forming drum, these forming drums expansible to increase diameters and contractible to decrease the diameters, which apparatus comprises: one frame base movable toward and away from the one forming drum; the other frame base movable toward and away from the other forming drum; annular members being able to be arranged on said frame bases and having chucks, respectively; each of said chucks expansible and contractible by receiving driving power from the frame base upon being arranged thereon to grasp a cylindrical member on its outside and being able to grasp the cylindrical member even upon being removed from the frame base; and a transfer mechanism provided between the one and other frame bases for transferring the annular member grasping the cylindrical member from the first frame base to the other frame base and transferring the annular member having no cylindrical member from the other frame base to the one frame base.

With this arrangement, when a cylindrical member is transferred from one forming drum to the other forming drum, first the annular member is arranged on one frame base. The one frame base having the annular member thereon and the one forming drum are moved toward each other so that the annular member is loosely fitted on the forming drum. Thereafter, the chuck is contracted to decrease its diameter by means of driving power from the frame base so that the cylindrical member on the one forming drum is grasped on its outside by the chuck. At this time, the one forming drum is contracted to decrease its diameter to transfer the cylindrical member from the forming drum to the annular member. Thereafter, the one frame base, the annular member and the cylindrical member are moved away from the one forming drum. After the annular member grasping the cylindrical member is removed from the one frame base by means of the transfer mechanism, the annular member is transferred to the other frame base and arranged thereon.

When the annular member is transferred by the transfer mechanism, the annular member is disengaged from any of the frame bases. Therefore, it may be considered that without supply of driving force from the frame bases, the chuck expands to release the cylindrical member. However, such a release of the cylindrical member is completely prevented, because the chuck is kept to grasp the cylindrical member even if the annular member is disengaged from the frame base.

Thereafter, the other frame base, the annular member and the cylindrical member are moved toward the other forming drum so that the cylindrical member and the annular member are loosely fitted on the other forming drum. The other forming drum is then expanded to increase its diameter and the chuck of the annular member is expanded to increase its diameter by driving force from the other frame base so that the cylindrical member is transferred from the annular member to the other forming drum. In order to transfer a cylindrical member, the small-sized and light weight annular member having only a function of grasping a cylindrical member is removed from the one frame base and transferred to the other frame base in this manner according to the invention. Therefore, the cylindrical member is smoothly transferred even if both the forming drums are not coaxial or there is any obstruction therebetween.

The invention will be more fully understood by referring to the following detailed specification and the appended claims taken in connection with the accompanying drawings.

BRIEF DESCRIPTION OF THE DRAWINGS

FIG. 1 is a plan view schematically illustrating an entire apparatus according to one embodiment of the invention;

FIG. 2 is a plan view illustrating the proximity of first and second band forming drums of the apparatus shown in FIG. 1;

FIG. 3 is a front elevation of those shown in FIG. 2;

FIG. 4 is a plan view illustrating an upper surface of a frame base used in the apparatus viewed in a direction of arrows IV in FIG. 3;

FIG. 5 is a partial sectional view taken along the line V—V in FIG. 4;

FIG. 6 is a front elevation of an annular member used in the apparatus;

FIG. 7 is a side view of the annular member shown in FIG. 6;

FIG. 8 is a bottom plan view illustrating a bottom surface of the frame base viewed in a direction of arrows VIII in FIG. 6;

FIG. 9 is a partial sectional view taken along the line IX—IX in FIG. 8;

FIG. 10 is a front elevation illustrating the proximity of a tire forming drum used in the apparatus;

FIG. 11 is a side view similar to FIG. 10;

FIG. 17 is a side view of the mechanism shown in FIG. 15;

FIG. 18 is a sectional view taken along the line XVIII—XVIII in FIG. 15;

FIG. 19 is a view illustrating the partially removed mechanism viewed in a direction of arrows XIX in FIG. 18; and FIG. 20 is a view illustrating the mechanism viewed in a direction of arrows XX in FIG. 19.

EXPLANATION OF THE PREFERRED EMBODIMENT

Figure 12:
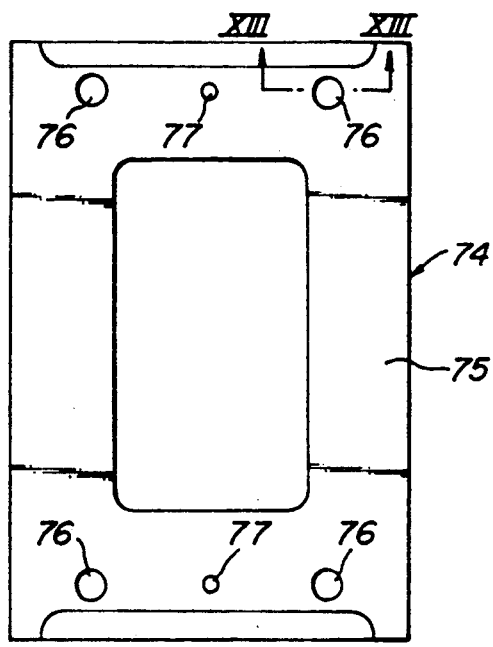
FIG. 12 is a plan view illustrating an upper surface of another frame base used in the apparatus viewed in a direction of arrows XII in FIG. 10.

Referring to FIGS. 1, 2 and 3, a plurality of belt ply supply means 1 and 2 (two in this embodiment) are arranged extending in traverse directions in parallel with each other and spaced a predetermined distance L in their width directions from each other. The "traverse" direction as used herein refers to the direction from an upper portion to a lower portion or from the lower portion to the upper portion in the drawing, FIG. 1 illustrating the apparatus in a plan view. On the other hand, the "longitudinal" direction refers to the direction perpendicular to the traverse direction.

Belt plies V1 and V2 of different kinds, for example, different in inclination angle of reinforcing cords are supplied from these belt ply supply means 1 and 2 from rearward to forward positions or from the upper to the center portion of the drawing, FIG. 1. The word "rearward" as used herein means a side of the upper portion of the drawing, FIG. 1 and the word "forward" means a side of the lower portion of FIG. 1. On the outer or left side of the belt ply supply means 1 viewed in FIG. 1 is arranged a first tread supply means 3 extending in parallel with and spaced twice the predetermined distance L from the belt ply supply means 1.

On the other hand, on the outer or right side of the belt ply supply means 2 is arranged a second tread supply means 4 extending in parallel with and spaced twice the predetermined distance L from the belt ply supply means 2. Treads T of the same or different kinds are supplied from these first and second tread supply means 3 and 4 from rearward to forward positions. Moreover, these belt ply supply means 1 and 2 and first and second tread supply means 3 and 4 are arranged substantially in the same horizontal plane.

A horizontal base 8 is arranged extending in a longitudinal direction perpendicular to the extending directions of the belt ply supply means 1 and 2 and immediately forward of the belt ply supply means 1 and 2 and the first and second tread supply means 3 and 4. A pair of rails 9 are arranged on and extending straight along the horizontal base 8. First and second rectangular trolleys 12 and 13 are arranged on the pair of rails 9 through a plurality of slide bearings 14 and 15 which are mounted on undersides of the trolleys 12 and 13 and slidably engaging the rails 9.

Rodless cylinders 16 and 17 are mounted on and extending along the base 8. The first and second trolleys 12 and 13 are connected to movable blocks (not shown) of the rodless cylinders 16 and 17. As a result, when the rodless cylinders 16 and 17 are actuated, the first and second trolleys 12 and 13 are moved straight and guided by the rails 9 in a horizontal plane immediately forward of the belt ply supply means 1 and 2 and the first and second tread supply means 3 and 4 in directions perpendicular to those of the belt ply supply means 1 and 2 and the first and second tread supply means 3 and 4. In this case, movable distances of the first and second trolleys 12 and 13 caused by the rodless cylinders 16 and 17 are twice the predetermined distance L.

On upper surfaces of the first and second trolleys 12 and 13 in FIG. 3, respectively, are arranged pairs of rails 18 and 19 with which are slidably engaged slide bearings 22 and 23 supporting thereon first and second band forming units 20 and 21, respectively. The first and second band forming units include first and second driving means 24 and 25 and first and second band forming drums 26 and 27 extending from the driving means toward each other or onto an inner side of the driving means 24 and 25, respectively. These first and second band forming drums 26 and 27 are expansible to increase diameters and contractible to decrease diameters and rotatively driven about their axes by the first and second driving means 24 and 25, respectively.

The first and second trolleys 12 and 13 are provided with cylinders 28 and 29 mounted thereon, respectively, which are in parallel with the rails 18 and 19 and have piston rods (not shown) connected to the first and second band forming units 20 and 21, respectively. As a result, when the cylinders 28 and 29 are actuated, the first and second band forming units 26 and 27 are moved straight in a horizontal plane guided by the rails 18 and 19 immediately forward of the belt ply supply means 1 and 2 and the first and second tread supply means 3 and 4 and in directions perpendicular to these means 1, 2, 3 and 4. Movable distances of the first and second band forming units 26 and 27 with the aid of the cylinders 28 and 29 are substantially equal to the above predetermined distance L.

As a result, when the first trolley 12 has been moved to the right limit position and the first driving means 24 has been moved to the left limit position by actuating the rodless cylinder 16 and the cylinder 28, the first band forming drum 26 just arrives at a supply position A immediately forward of the belt ply supply means 1. Moreover, when the first trolley 12 and the first driving means 24 have been moved together to the right limit positions, the first band forming drum 26 just arrives at a supply position B immediately forward of the belt ply supply means 2. Further, when the first trolley 12 and the first driving means 24 have been moved together to the left limit positions, the first band forming drum 26 just arrives at a supply position C immediately forward of the first tread supply means 3. Furthermore, when the first trolley 12 has been moved to the left limit position and the first driving means 24 has been moved to the right limit position, the first band forming drum 26 just arrives at a taking-out position D spaced the distance L from the supply positions A and C, respectively, or positioned intermediate the supply positions A and C.

The rodless cylinder 16 and the cylinder 28 form as a whole first moving means 30 for successively moving the first band forming drum 26 to the supply positions A and B of the belt ply supply means 1 and 2 and to the supply position C of the first tread supply means 3 and the taking-out position D. At the supply positions A and B, the belt plies V1 and V2 supplied from the belt ply supply means 1 and 2, respectively, are successively wound around the first band forming drum 26. At the supply position C, a tread T supplied from the first tread supply means 3 is further wound around the belt plies V1 and V2 on the first band forming drum 26 to form a band U as a cylindrical member. At the taking-out position D, moreover, the formed band U is removed from the first band forming drum 26.

On the other hand, when the second trolley 13 and the second driving means 25 have been moved together to left limit positions by actuating the rodless cylinder 17 and the cylinder 29, the second band forming drum 27 just arrives at the supply position A. Moreover, when the second trolley 13 has been moved to the left limit position and the second driving means 25 has been moved to the right limit position, the second band forming drum 27 just arrives at the supply position B. Further, when the second trolley 13 and the second driving means 25 have been moved together to the right limit positions, the second band forming drum 27 just arrives at a supply position E immediately forward of the second tread supply means 4. Furthermore, when the second trolley 13 has been moved to the right limit position and the second driving means 25 has been moved to the left limit position, the second band forming drum 27 just arrives at a taking-out position F spaced the distance L from the supply positions B and E, respectively, or intermediate the supply positions B and E.

The rodless cylinder 17 and the cylinder 29 form as a whole second moving means 31 for successively moving the second band forming drum 27 to the supply positions A and B of the belt ply supply means 1 and 2 and to the supply position E of the second tread supply means 4 and the taking-out position F. At the supply positions A and B, belt plies V1 and V2 supplied from the belt ply supply means 1 and 2 are successively wound around the second band forming drum 27. At the supply position E, a tread T supplied from the second tread supply means 4 is further wound around the belt plies V1 and V2 on the second band forming drum 27 to form a band U as a cylindrical member. Further, at the taking-out position F, the formed band U is removed from the second band forming drum 27.

First and second frame bases 37 and 38 are fixed to inner opposite ends of the first and second trolleys 12 and 13, respectively. When the first and second band forming units 20 and 21 are moved on the first and second trolleys 12 and 13 by the cylinders 28 and 29, the first and second band forming drums 26 and 27 are moved toward and away from the first and second frame bases 37 and 38, respectively. Moreover, distances between the first frame base 37 and the first band forming drum 26 moved to the left limit position and between the second frame base 38 and the second band forming drum 27 moved to the right limit position are equal to the distance L.

An upper surface 39 of each of the first and second frame bases 37 and 38 is rectangular as shown in FIGS. 4 and 5 and formed at four corners with fitting apertures 40 for positioning, each of which is frustoconical, tapered downwardly or inwardly. The upper surface 39 of each frame base 37 or 38 is further formed at forward and rearward ends with connecting openings 41 to be connected to a pressurized air source through hoses and selector valves (not shown) for driving (pneumatically in this embodiment) an annular member to be described hereinafter.

FIGS. 6, 7, 8 and 9 illustrate each of the annular members 46 to be located on the first and second frame bases 37 and 38, respectively. Each of the annular members 46 comprises a box-shaped framework 47, an annular body 48 whose lower end is fixed to the framework 47 and a cam ring 49 concentric to and rotatably supported by the annular body 48. The annular body 48 is formed with a plurality of slits 50 extending in radial directions and spaced circumferentially equiangularly one relative to the other. On the other hand, the cam ring 49 is formed with a plurality of inclined slits 51 spaced circumferentially equidistant one relative to the other.

A plurality of chuck segments 52 are supported movably in the radial directions by the annular body 48 and spaced circumferentially equidistant one relative to the other. The chuck segments 52 are connected to rollers (not shown) inserted in the slits 50 and 51. As a result, when the cam ring 49 is rotated, the chuck segments 52 are moved in the radial directions in synchronism with each other so that a chuck 53 consisting of the chuck segments 52 is expanded or contracted to increase or decrease its diameter.

To the annular body 48 is connected a head end of a cylinder 54 having a piston rod 55 whose outer end is connected to the cam ring 49. A bottom surface 56 of the framework 47 for each of the annular members 46 is rectangular, similar to the upper surface 39, and formed at four corners with fitting protrusions 57 which are frustoconical, tapered toward their ends and in snugly fitted relations with the fitting apertures 40. When the annular members 46 are arranged on the first and second frame bases 37 and 38, the fitting protrusions 57 are fitted in the fitting apertures 40 of the first and second frame bases 37 and 38, respectively, to position the annular members 46 relative to the first and second frame bases 37 and 38 with high accuracy.

Moreover, the bottom surface 56 of the framework 47 is formed in forward and rearward ends with connecting openings 58 which ar connected to the connecting openings 41 through couplers (not shown) when the annular member 46 is mounted on the first or second frame base 37 or 38. These connecting openings 58 and the cylinders 54 are connected to each other through passages and hoses (not shown).

With the connecting openings 41 and 58 being connected, pressurized air as driving power is supplied from the pressurized air source into the cylinder 54 or exhausted from the cylinder 54. By supplying or exhausting the pressurized air, the chuck 53 is expanded or contracted. When the chuck 53 is contracted, the band U as a cylindrical member formed on the first or second forming drum 26 or 27 can be grasped on its outside by the chuck 53.

A spring 60 as a retaining mechanism is provided in the cylinder 54 for urging the piston 59 and the piston rod 55 in an extending direction (FIG. 6). When the annular member 46 including the contracted chuck 53 grasping the band U on its outside is removed from the first or second frame base 37 or 38 so that the annular member 46 is not supplied with pressurized air, the spring 60 serves to urge the piston rod 55 and the chuck 53 against the band U to maintain the chuck in band grasping condition, thereby preventing the band U from shifting in position or the like in transferring the annular member 46.

Referring to FIGS. 1, 10 and 11, there is provided a tire forming unit 65 arranged forward of the second band forming unit 21. The tire forming unit 65 includes driving means 66 and a tire forming drum 67 as another forming drum extending from the driving means 66 in the left direction viewed in FIG. 1. The tire forming drum 67 is rotatable about an axis in parallel with the second band forming drum 27 and has a bladder 68 (FIG. 10) deformable into a toroid shape by the driving means 66. The band U and a green case G transferred by a loader (not shown) are combined to form a green tire T on the tire forming drum 67.

Figure 13:
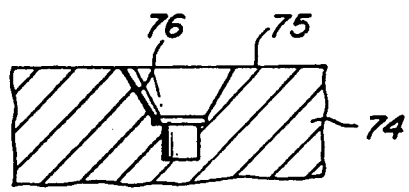
FIG. 13 is a partial sectional view taken along the line XIII—XIII in FIG. 12.

On the left side of the tire forming unit 65 is arranged a base 70 extending in parallel with the base 8. On the base 70 are arranged a pair of rails 71 extending straight along the base 70. A carriage 72 is arranged slidably on the rails 71 and has slide bearings 73 mounted on an underside of the carriage 72 and slidably engaging the rails 71. Onto the carriage 72 is fixed a third frame base 74 as a further frame base whose upper surface 75 is formed with fitting apertures 76 and connecting openings 77 shown in FIGS. 12 and 13 similar to the fitting apertures 40 and connecting openings 41 in the frame bases 37 and 38. These connecting openings 77 are connected through couplers to connecting openings 58 of the annular member 46 for supplying pressurized air. The annular member 46 can be arranged on the third frame base 74.

Figure 14:
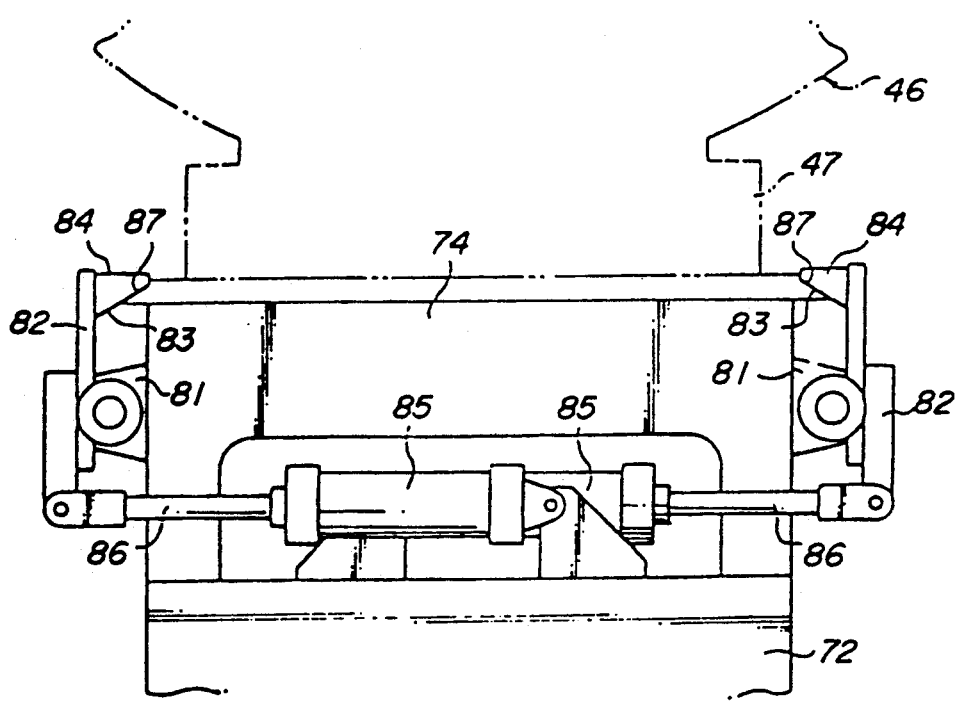
FIG. 14 is a side view illustrating the proximity of a third frame base used in the apparatus.
Figure 15:
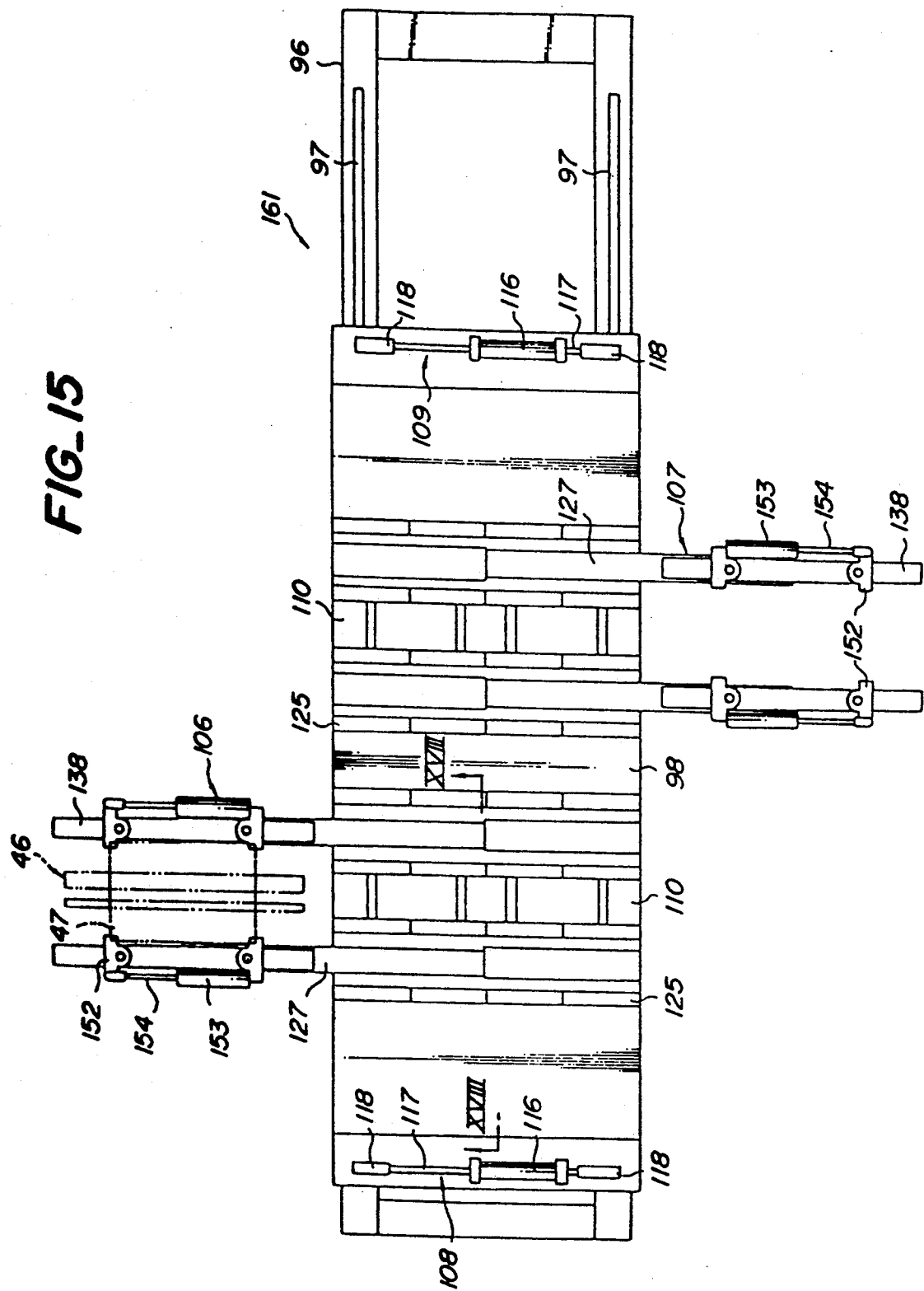
FIG. 15 is a plan view illustrating a transfer mechanism used in the apparatus.
Figure 16:
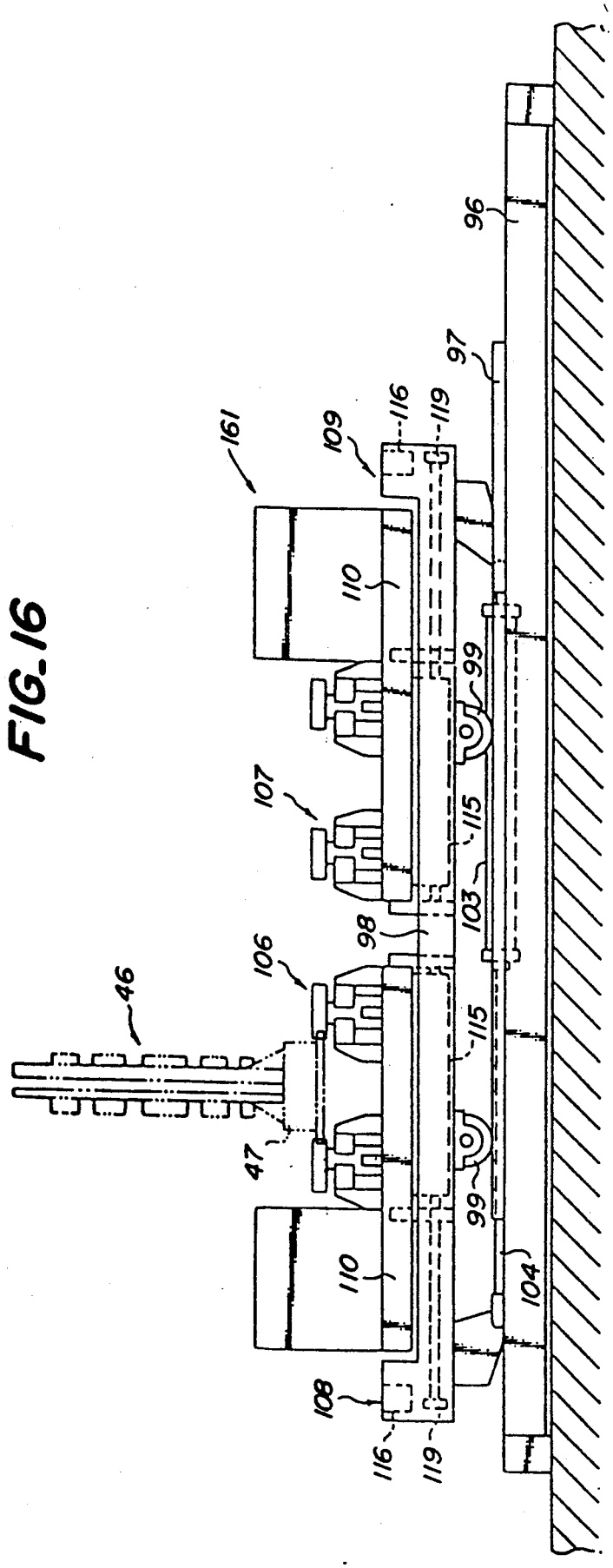
FIG. 16 is a front elevation of the mechanism show in FIG. 15.

As shown in FIGS. 11 and 14, brackets 81 are fixed to forward and rearward end faces of the third frame base 74, respectively. The brackets 81 rockably support the centers of rocking arms 82 having upper ends to which are fixed pressing pieces 84 having inclined surfaces 83. Cylinders 85 have head ends connected to the carriage 72 and piston rods 86 whose rod ends are connected to lower ends of the rocking arms 82. When the piston rods 86 of the cylinders 85 are extended to rock the rocking arms 82 into upstanding positions, the inclined surfaces 83 of the pressing pieces 84 are brought into surface contact with inclined surfaces 87 formed at angles substantially equal to those of the inclined surfaces 83 on the framework 47 of the annular member 46. Consequently, the annular member 46 is locked to the third frame base 74 by wedge action of these inclined surfaces.

In FIG. 10, a rodless cylinder 91 is connected to the base 70 and extending therealong. The carriage 72 is connected to a movable block (not shown) of the rodless cylinder 91. As a result, when the rodless cylinder 91 is actuated, the carriage 72 and the third frame base 74 are moved straight in a horizontal plane guided by the rails 71 along the axis of the tire forming drum 67 toward and away from the tire forming drum 67.

Referring to FIGS. 1, 15, 16 and 17, between the bases 8 and 70 is arranged a base 96 extending in parallel with the base 8. A pair of rails 97 are arranged on the base 96 and extending therealong. A rectangular movable trolley 98 is movable on the rails 97 with the aid of a plurality of wheels 99 mounted on an underside of the trolley 98 and rolling contacting the rails 97. A cylinder 103 extends along the base 96 and has a head end connected to the base 96 and a piston rod 104 whose rod end is connected to the movable trolley 98. When the cylinder 103 is actuated, the movable trolley 98 is moved in a horizontal plane guided by the straight rails 97 through a distance equal to the distance L.

A pair of transfer assemblies 106 and 107 are arranged on the movable trolley 98 and spaced the distance L from each other in the longitudinal direction and are movable in traverse directions together with the annular members 46 grasped thereby. The transfer assemblies 106 and 107 are raised and lowered by a pair of lift assemblies 108 and 109 through a some distance, in more detail a distance slightly longer than the extending distance of the fitting protrusions 57.

The transfer assemblies 106 and 107 have rectangular base plates 110, respectively, and the lift assemblies 108 and 109 have pairs of eccentric rods 115 interposed between the these base plates 110 and the movable trolley 98. The eccentric rods 115 horizontally extend in the longitudinal directions of the movable trolley 98 and eccentrically rotate about axes positioned spaced from sectional centers of the eccentric rods 115. When the eccentric rods 115 are rotated, the transfer assemblies 106 and 107 are raised or lowered.

To both ends of the movable trolleys 98 are mounted double-acting cylinders 116 having piston rods 117 whose rod ends are provided with racks 118 fixed thereto. The racks 118 are in mesh with pinions 119 secured to the eccentric rods 115. Consequently, when the cylinders 116 are actuated, the eccentric rods 115 are rotated. The eccentric rods 115, cylinders 116, racks 118 and pinions 119 form as a whole the lift assemblies 108 and 109, respectively.

As shown in FIGS. 1, 15, 16, 17, 18, 19 and 20, two pairs of brackets 125 are spaced in a longitudinal direction of the movable trolley 98 and mounted thereon. Horizontal rails 126 having U-shaped sections and extending in width directions of the movable trolley 98 are fixed to inner surfaces of each pair of the brackets 125 in opposition to each other, respectively. Center arms 127 are arranged between the rails 126 and extend in parallel therewith. Lengths of the center arms 127 are substantially equal to a width of the movable trolley 98.

A plurality of rollers 128 are rotatably supported on outer surfaces of the center arms 127 to be in rolling contact with the rails 126. As a result, the center arms 127 are movable, guided by the rails 126, in a horizontal plane in traverse directions. Onto each of the base plates 110 is mounted a motor 131 with a reduction device whose output shaft 132 is provided with an external gear 130 fixed thereto. Transmission shafts 133 are rotatably supported by bearings (not shown) provided on the base plate 110. An external gear 134 to be in mesh with the external gear 130 is fixed to each of the transmission shafts 133.

A rack 135 extending along one of the center arms 127 is secured thereto and in mesh with the pinion 136 fixed to the transmission shaft 133. As a result, when the motor 131 with the reduction device is actuated, the center arms 127 are moved in the traverse directions. A forward arm 138 is interposed between each pair of center arms 127 and extending therealong and is formed with guide grooves 139 extending in a longitudinal direction of the forward arm 138.

A plurality of rollers 140 are rotatably supported on inner surfaces of the center arms 127 and are inserted in the guide grooves 139 so as to be in rolling contact therewith. A chain 141 has one end connected to the center arm 127 and the other end connected to the forward arm 138. A mid portion of the chain 141 extends around and in mesh with a sprocket 142 rotatably supported by a shaft 143 which is in turn supported by the center arms 127. As a result, when the center arms 127 are moved, the forward arm 138 is moved guided by the guide grooves 139 in the same direction as the direction moved of the center arms 127 through a distance twice the moved distance of the center arms 127.

Grasping pawls 152 are rotatably supported through pins 151 at forward and rearward ends of each of the forward arms 138. Each of the forward arms 138 is provided with a cylinder 153 whose head end is connected to one end of the one grasping pawl 152 and rod end of a piston rod 154 of the cylinder 153 is connected to one end of the other grasping pawl 152. As a result, when the cylinder 153 is actuated, the grasping pawls 152 are rotated in synchronism with each other. Each of the grasping pawls 152 is formed in the other end with a recess 155 for receiving a corner of the framework 47 of the annular member 46. When the grasping pawls 152 are rotated to insert the corners of the framework 47 into the recesses 155, the annular member 46 is held by the transfer assemblies 106 and 107.

The base plates 110, the center arms 127, the motors 131 with the reduction devices, the forward arms 138, the chains 141, the grasping pawls 152 and the cylinders 153 form as a whole the transfer assemblies 106 and 107. Moreover, the movable trolley 98, the transfer assemblies 106 and 107 and the lift assemblies 108 and 109 form as a whole a transfer mechanism 161 which is provided between the first, second and third frame bases 37, 38 and 74 for transferring the annular members 46 grasping bands U from the first and second frame bases 37 and 38 to the third frame base 74 or transferring the annular member 46 having no tire member from the third frame base 74 to the first and second frame bases 37 and 38. Moreover, the first, second and third frame bases 37, 38 and 74 and the transfer mechanism 161 form as a whole taking-out means 162 for removing formed band U from the first and second band forming drums 26 and 27 and transferring them to the tire forming drum 67.

The taking-out means 162 takes formed bands U out of the first and second band forming drums 26 and 27, alternately, and transfers the bands U to one tire forming drum 67 in this manner. Therefore, the first and second band forming drums 26 and 27 of long forming cycle times and the tire forming drum 67 of short forming cycle time can be operated with high efficiency or with less loss time. Moreover, even if any one of the band forming drums 26 and 27 has failed, the forming operation can be continued without stopping the entire apparatus.

The operation of the apparatus of the above embodiment of the invention will be explained hereinafter. First, the operations in connection with the first and second band forming drums 26 and 27 will be explained. It is now assumed that the first band forming drum 26 is positioned at the supply position C and does not have plies wound therearound. At this time, the second band forming drum 27 is positioned at the supply position E and has a formed band U wound therearound. At this time, moreover, the annular members 46 are not arranged on the first and second frame bases 37 and 38 yet.

The rodless cylinder 16 is then actuated to move the first trolley 12 a distance of twice the distance L to the right viewed in FIG. 2. Consequently, the first band forming drum 26 arrives at the supply position A immediately forward of the belt ply supply means 1. Belt plies V1 of a predetermined type are then supplied from the belt ply supply means 1 to the first band forming drum 26, while the first band forming drum 26 is rotated by means of the first driving means 24 so that the plies V1 are wound around the first band forming drum 26.

The cylinder 28 is actuated to extend the piston rod so that the first band forming drum 26 is moved a distance equal to the distance L to the right. As a result, the first band forming drum 26 is moved to the supply position B immediately forward of the belt ply supply means 2. Under this condition, belt plies V2 of a kind different from that of the belt plies V1 are supplied from the belt ply supply means 2 to the first band forming drum 26, while the first band forming drum 26 is rotated so that the belt plies V2 are wound around the first band forming drum 26 over the belt plies V1. In this manner, the first band forming drum 26 is successively moved to the positions A and B of the belt ply supply means 1 and 2 by the operation of the first moving means 30 so that the belt plies V1 and V2 different in kind supplied from the belt ply supply means 1 and 2 at the supply positions A and B are successively wound around the first band forming drum 26.

Thereafter, the rodless cylinder 16 is operated to move the first trolley 12 a distance of twice the distance L to the left, while at the same time the cylinder 28 is operated to move the first band forming unit 20 a distance equal to the distance L to the left. As a result, the first band forming drum 26 with the belt plies V1 and V2 wound therearound is moved from the supply position B to the supply position C immediately forward of the first tread supply means 3. A tread T is then supplied from the first tread supply means 3 to the first band forming drum 26 and is further wound around the belt plies V1 and V2 on the first band forming drum 26.

On the side of the second band forming drum 27, the following operation is performed simultaneously with the winding of the belt plies V1 and V2 and the tread T onto the first band forming drum 26 (forming the band U). First, the annular member 46 having no tire member is transferred to and arranged onto the second frame base 38 positioned at the taking-out position F by means of the transfer mechanism 161. At this time, the fitting protrusions 57 of the annular member 46 are fitted in the fitting apertures 40 of the second frame base 38 to exactly position the annular member 46 relative to the second frame base 38, and the connecting openings 41 and 58 are connected to each other so that the cylinder 54 of the annular member 46 is ready for receiving pneumatic power as the driving force.

Thereafter, the piston rod of the cylinder 29 is extended to move the second band forming unit 21 to the left viewed in FIG. 1 to approach the annular member 46 on the second frame base 38. When the second band forming drum 27 has moved the distance L to arrive at the taking-out position F, the movement of the second band forming drum 27 is stopped. At this time, the second band forming drum 27 has been loosely fitted in the annular member 46 and the band U. The selector valve is switched over to supply the driving force (pneumatic power) into the cylinder 54 of the annular member 46 on the second frame base 38 from the pressurized air source through the connecting openings 41 and 58 and the hoses.

As a result, the piston rod 55 of the cylinder 54 extends to rotate the cam ring 49 of the annular member 46 so that the chuck segments 52 move radially inwardly in synchronism with each other to reduce the diameter of the chuck 53. The reduction in diameter of the chuck 53 is stopped when inner circumferential surfaces of the chuck segments 52 abut against an outer circumferential surface of the band U. Thereafter, when the second band forming drum 27 contracts to reduce its diameter, the band U is transferred from the second band forming drum 27 to the chuck 53 of the annular member 46. The piston rod of the cylinder 29 is then retracted so that the second band forming drum 27 is moved to the right to return to the supply position E.

Thereafter, the annular member 46 grasping the band U on its outside is removed from the second frame base 38 by means of the transfer mechanism 161. In this case, it may be considered that because the annular member 46 removed from the second frame base 38 could not receive the driving force (pneumatic power) therefrom, the diameter of the chuck 53 is expanded to release the band U grasped thereby. In this embodiment, however, the chuck 53 is urged against the band U with the aid of the spring 60 so that the band U is kept grasped by the chuck 53, although the annular body 46 is removed from the second frame base 38. Therefore, the band U is prevented from being released with a great certainty.

The winding operation of the belt plies V1 and V2 and the tread T onto the first band forming drum 26 as described above is carried out simultaneously with the taking-out operation of the band U from the second band forming drum 27 with the aid of the annular member 46. The cycle times of the winding and taking-out operations are substantially equal to each other so that the first and second forming drums 26 and 27 scarcely lose time in operation.

The rodless cylinder 17 is then actuated to move the second trolley 13 a distance of twice the distance L to the left, while the cylinder 29 is actuated to move the second band forming unit 21 a distance equal to the distance L to the left. As a result, the second band forming drum 27 has been moved from the supply position E to the supply position A. Belt plies V1 are then supplied from the belt ply supply means 1 onto the second band forming drum 27 and wound therearound. Thereafter the cylinder 29 is actuated to move the second band forming drum 27 a distance equal to the distance L to the right.

As the result, the second band forming drum 27 has been moved from the supply position A to the supply position B. Under this condition, belt plies V2 are supplied from the belt ply supply means 2 onto the second band forming drum 27 and wound over the belt ply V1 wound thereon. In this manner, by the operation of the second moving means 31 the second band forming drum 27 is successively moved to the first and second supply positions A and B of the belt ply supply means 1 and 2, and at the respective supply positions A and B the belt plies V1 and V2 different in kind supplied from the belt ply supply means 1 and 2, respectively, are successively wound around the second band forming drum 27.

Thereafter, the rodless cylinder 17 is actuated to move the second trolley 13 a distance of twice the distance L to the right so that the second band forming drum 27 is moved from the supply position B to the supply position E. A tread T is then supplied from the second tread supply means 4 to the second band forming drum 27, while the second band forming drum 27 is being rotated by the second driving means 25 so that the tread T is further wound around the belt plies V1 and V2 on the second band forming drum 27. In this manner, a band U is formed around the second band forming drum 27.

On the side of the first band forming drum 26, the following operation is performed simultaneously with the winding of the belt plies V1 and V2 and the tread T onto the second band forming drum 27 (forming the band U). First, the annular member 46 having no tire member is transferred to and arranged onto the first frame base 37 positioned at the taking-out position D by means of the transfer mechanism 161. At this time, the fitting protrusions 57 of the annular member 46 are fitted in the fitting apertures 40 of the first frame base 37 to exactly position the annular member 46 relative to the first frame base 37, and the connecting openings 41 and 58 ar connected to each other so that the cylinder 54 of the annular member 46 is ready for receiving the driving force (pneumatic power).

Thereafter, the piston rod of the cylinder 28 is extended to move the first band forming drum 26 a distance equal to the distance L to the right so as to arrive at the taking-out position D. At this time, the first band forming drum 26 has been loosely fitted in the annular member 46 and the band U. Thereafter, the cylinder 54 of the annular member 46 is supplied with pressurized air to contract the diameter of the chuck 53 so that the band U is grasped on its outside by the chuck 53. Moreover, the first band forming drum 26 is contracted to reduce its diameter so that the band U is transferred from the first band forming drum 26 to the annular member 46. The cylinder 28 is then actuated to move the first band forming drum 26 a distance equal to the distance L to the left so as to return the supply position C.

Thereafter, the annular member 46 grasping the band U on its outside is removed from the first frame base 37 by means of the transfer mechanism 161. At this time, the spring 60 keeps the chuck 53 grasping the band U. Therefore, the band U is not removed from the chuck 53 even if the annular member 46 is removed from the first frame base 37 in the same manner as above described. The winding operation of the belt plies V1 and V2 and the tread T onto the second band forming drum 27 is carried out simultaneously with the taking-out operation of the band U from the first band forming drum 26 with the aid of the annular member 46. The cycle times of the winding and taking-out operations are substantially equal to each other so that the first and second forming drums 26 and 27 scarcely cause loss time in operation.

As above described, the operation of forming the band at the first band forming drum 26 is performed simultaneously with the operation of taking-out the formed band U from the second band forming drum 27 and the operation of forming the band at the second band forming drum 27 is performed simultaneously with the operation of taking-out the formed band U from the first band forming drum 26. In this case, the word "simultaneously" includes of course the case wherein cycle times of the operations are substantially equal and starting and finishing of these operations are substantially at the same time. Further it includes the case wherein the cycle times of these operations are different and any operation starts or finishes earlier than the other operation does. That is, the word "simultaneously" refers to a period during which to proceed both of the operations at the same time.

The above description is one cycle of operations in connection with the first and second band forming drums 26 and 27. The same cycles are repeated to form bands U in succession, and the formed bands U are alternately taken out from the first and second band forming drums 26 and 27. In this embodiment, the numerous belt ply supply means 1 and 2 are common to the two band forming drum 26 and 27 so that the construction of the entire apparatus is simplified and small-sized. Moreover, exchanging of plies is easily effected when sizes of tires are changed.

Furthermore, even if any one of the band forming drums 26 and 27 or the tread supply means 3 and 4 encounters failures or trouble, the remaining band forming drum and tread supply means can continue the band forming operations without being affected with the problem. Therefore, there is no need for stopping the entire apparatus owing to the trouble of a portion of the apparatus. Although it may be considered to cause lost time in the case that the belt ply supply means 1 and 2 are commonly used in this embodiment, the winding of the belt plies and the tread and taking-out of the band are simultaneously carried out so that lost time can be prevented as effectively as possible without lowering production efficiency.

The operations in connection with the taking-out means 162 and the tire forming drum 67 will be explained hereinafter. It is now assumed that the movable trolley 98 of the taking-out means 162 has been moved to the right limit position as a result of the piston rod 104 being retracted in the cylinder 103, and the center arms 127 and the forward arm 138 of the transfer assemblies 106 and 107 have been retracted into the inside of the rails 126 and positioned above the base plates 110. At this time, the transfer assembly 106 holds the annular member 46 grasping the formed band U, whereas the other transfer assembly 107 holds the annular member 46 having no tire member.

The motor 131 with the reduction device of the transfer assembly 106 is energized so that the center arms 127 extend guided by the rails 126 toward the third frame base 74 waiting at the position S forward of the tire forming drum 67. At this time, the forward arms 138 are moved a distance of twice the moved distance of the center arms 127 in the same direction as the moved direction of the center arms 127 with the aid of the chains 141 and the sprockets 142. Simultaneously with the extensions of the center and forward arms 127 and 138 of the transfer assembly 106, the motor 131 with the reduction device of the transfer assembly 107 is energized so that the center arms 127 and the forward arms 138 are extended toward the second frame base 38 positioned at the taking-out position F in the same manner as the transfer assembly 106.

The extensions of the center and forward arms 127 and 138 of the transfer assemblies 106 and 107 are stopped when the forward arms 138 arrive at positions on both sides of the third and second frame bases 74 and 38, respectively. Thereafter, the cylinders 116 of the lift assemblies 108 and 109 are operated so as to eccentrically rotate the eccentric rods 115 to lower the transfer assemblies 106 and 107 through predetermined distances. As a result, the annular member 46 grasping the band U and held by the transfer assembly 106 is arranged on the third frame base 74, whereas the annular member 46 having no tire member and held by the transfer assembly 107 is arranged on the second frame base 38. At this time, the fitting protrusions 57 are fitted in the fitting apertures 76 and 40, respectively, so that these annular members 46 are exactly positioned relative to the third and second frame bases 74 and 38, respectively. On the other hand, the connecting openings 58 are connected to the connecting openings 77 and 41, respectively, so that the annular bodies 46 are ready for receiving the driving force (pneumatic power).

The cylinders 153 of the transfer assembly 106 are actuated in synchronism with each other to retract their piston rods 154. As a result, the grasping pawls 152 are rocked to positions in parallel with the forward arms 138 so that the four corners of the annular member 46 arranged on the third frame base 74 are disengaged from the recesses 155 of the grasping pawls 152 to release the annular member 46 from the grasping by the transfer assembly 106. Thereafter, the cylinders 85 of the third frame base 74 are actuated to extend their piston rods 86 so that the rocking arms 82 are rocked into upstanding positions. As a result, the pressing pieces 84 are brought into surface contact with the inclined surfaces 87 of the framework 47 of the annular member 46 so that the framework 47 is urged against the third frame base 74 by the wedge action of the inclined surfaces. The result is that the annular member 46 is positioned relative to and locked to the third frame base 74. As a result, the band U grasped by the annular member 46 becomes exactly coaxial with the tire forming drum 67.

The motor 131 with the reduction device of the transfer assembly 106 is then actuated to retract the center and forward arms 127 and 138 to positions immediately above the base plate 110 in order to avoid any interference with the movement of the annular member 46. Thereafter, the rodless cylinder 91 is actuated to move the trolley 72, the third frame base 74 and the annular member grasping the band U along the rails 71 to the right to a position between the tire forming drum 67 and the driving means 66. At this time, a cylindrical green case G is transferred to the tire forming drum 67 by means of a loader (not shown) and arranged around the forming drum 67.

Thereafter, the rodless cylinder 91 is actuated to move the trolley 72, the third frame base 74 and the annular member 46 to the left so that the tire forming drum 67 is loosely fitted in the annular member 46 and the band U. The bladder 68 of the tire forming drum 67 expands to increase its diameter to deform the green case G into a toroid shape. At this time, the radially outer circumferential surface of the green case G is pressed against the radially inner circumferential surface of the band U grasped by the annular member 46 to form a green tire.

The cylinder 54 of the annular member 46 is then supplied with pressurized air from the pressurized air source to retract the piston rod 55 so that the chuck 53 is expanded to increase its diameter. The result is that the formed green tire is transferred from the annular member 46 to the tire forming drum 67. Thereafter, the rodless cylinder 91 is actuated to move the trolley 72, the third frame base 74 and the annular member 46 having no tire member to the left to the poising position S. At this time, after contraction of the bladder 68, the formed green tire is removed from the tire forming drum 67 and is transferred to the next station for the next process by the loader.

The motor 131 with the reduction device of the transfer assembly 106 is then energized to extend the center and forward arms 127 and 138 of the transfer assembly 106 toward the third frame base 74. The movement of these arms is stopped when the forward arms 138 arrive at the annular member 46 on the third frame base 74. Thereafter, the piston rod 154 of the cylinder 153 of the transfer assembly 106 is extended to rock the gasping pawls 152 into positions perpendicular to the forward arms 138. As a result, the four corners of the annular member 46 arranged on the third frame base 74 enter the recesses 155 of the grasping pawls 152 so that the annular member 46 is held by the transfer assembly 106. The cylinder 85 of the third frame base 74 is then actuated to rock the rocking arms 82 into horizontal positions so that the positioning and locking of the annular member 46 relative to the third frame base 74 are released.

Simultaneously with the forming of the green tire on the tire forming drum 67, the band U formed on the second band forming drum 27 is supplied to the annular member 46 arranged on the second frame base 38 and grasped by the annular member 46 as above described. At this time, the center and forward arms 127 and 138 of the transfer assembly 107 are maintained in the extended condition.

Thereafter, cylinders 116 of the lift assemblies 108 and 109 are actuated to rotate the eccentric rods 115 to raise the transfer assemblies 106 and 107 grasping the annular members, respectively, through predetermined distances. Therefore, the fitting protrusions 57 of the respective annular members 46 leave the fitting apertures 76 and 40, whereas the connecting openings 58 are disengaged from the connecting openings 77 and 41.

The motors 131 with the reduction devices of the transfer assemblies 106 and 107 are then energized, the center and forward arms 127 and 138 are retracted together with the annular members 46 grasped thereby to positions immediately above the base plate 110. The cylinder 103 is then actuated to move the movable trolley 98 along the rails 97 to the left limit position.

Thereafter, the motors 131 with the reduction devices of the transfer assemblies 106 and 107 are energized t extend the center and forward arms 127 and 138 of the transfer assembly 106 grasping the annular member 46 having no tire member toward the first frame base 37 positioned at the taking-out position. The center and forward arms 127 and 138 of the transfer assembly 107 grasping the band U are extended toward the third frame base 74. The extensions of the center and forward arms 127 and 138 of the transfer assemblies 106 and 107 are stopped when the forward arms 138 arrive onto both sides of the third and first frame bases 74 and 37. The cylinders 116 of the lift assemblies 108 and 109 are then actuated to lower the transfer assemblies 106 and 107 through predetermined distances.

As the result, the annular member 46 grasping the band U is arranged on the third frame base 74, while the annular member 46 having no tire member is arranged on the first frame base 37. At this time, as the fitting protrusions 57 have been fitted in the fitting apertures 76 and 40, respectively, the annular members 46 are exactly positioned relative to the third and first frame bases 74 and 37, respectively. Moreover, as the connecting openings 58 have been connected to the connecting openings 77 and 41, respectively, the annular members 46 are ready for receiving the driving force.

The cylinder 153 of the transfer assembly 107 is actuated to release the grasping pawls 152 from the corners of the annular member 46 arranged on the third frame base 74. As a result, the annular member 46 is released from the holding of the transfer assembly 107. Thereafter, the cylinder 85 of the third frame base 74 is actuated to urge the framework 47 against the third frame base 74 by the wedge action of the pressing pieces 84 so that the annular member 46 is positioned relative to and locked against the third frame base 74. The motor 131 with the reduction device of the transfer assembly 107 is then energized to retract the center and forward arms 127 and 138 to positions immediately above the base plate 110 in order to avoid any interference with the movement of the annular member 46.

Thereafter, the rodless cylinder 91 is actuated to move the trolley 72, the third frame base 74 and the annular member 46 grasping the band U to the right to positions between the tire forming drum 67 and the driving means 66. At this time, a cylindrical green case G is mounted on the tire forming drum 67 by the loader (not shown). The rodless cylinder 91 is then actuated to move the trolley 72, the third frame base 74 and the annular member 46 to the left so that the tire forming drum 67 is loosely fitted in the annular member 46 and the band U.

The bladder 68 of the tire forming drum 67 is then expanded to increase its diameter so that the green case G is deformed into a toroid shape to press the green case G against the band U to form a green tire. Thereafter, the chuck 53 of the annular member 46 is expanded to increase its diameter so that the formed green tire is transferred from the annular member 46 to the tire forming drum 67. The rodless cylinder 91 is actuated to move the trolley 72, the third frame base 74 and the annular member 46 having no tire member to the left to the poising position S. At this time, the formed green tire is removed from the tire forming drum 67 in sequence with contraction of the bladder 68 and is transferred by the loader to a next station for a next process.

The motor 131 with the reduction device of the transfer assembly 107 is then energized to extend the center and forward arms 127 and 138 until the forward arms 138 arrive at the annular member 46 on the third frame base 74. The cylinder 153 of the transfer assembly 107 is then actuated to rock the grasping pawls 152 so that the annular member 46 is held by the transfer assembly 107. Thereafter, the cylinder 85 of the third frame base 74 is actuated to release the positioning and locking of the annular member 46 relative to the third frame base 74.

Simultaneously with the formation of the green tire on the tire forming drum 67 in this manner, the band U formed on the first band forming drum 26 is supplied to and grasped by the annular member 46 arranged on the first frame base 37 as above described. At this time, the center and forward arms 127 and 138 of the transfer assembly 106 are maintained in extended conditions.

Thereafter, the lift assemblies 108 and 109 are operated to raise the transfer assemblies 106 and 107 grasping the annular members, respectively, through predetermined distances. As a result, the fitting protrusions 57 of the respective annular members 46 are removed from the fitting apertures 76 and 40, while the connecting openings 58 are disengaged from the connecting openings 77 and 41. The motors 131 with the reduction devices of the transfer assemblies 106 and 107 are energized to retract the center and forward arms 127 and 138 together with the annular members 46 grasped thereby to the positions immediately above the base plate 110. The cylinder 103 is then actuated to move the movable trolley 98 along the rails 97 to the right limit position.

The above description is one cycle of the operations in connection with the taking-out means 162 and the tire forming drum 67. Thereafter, the same cycle is repeated in the same manner so that formed bands U are alternately taken out from the first and second band forming drums 26 and 27 and then these bands are supplied to the tire forming drum 67 where the bands are combined with the green cases G to form green tires one by one.

In this case, the forming of the bands at the first and second band forming drums 26 and 27, the taking-out and transferring of the bands by the taking-out means 162 and the forming of the green tires at the tire forming drum 67 are simultaneously carried out. Moreover, the one tire forming drum 67 is provided commonly to the two band forming drums 26 and 27 so that the entire apparatus can be simplified in construction and small-sized. Furthermore, as the annular member 46 having only a performance grasping a band U and small-sized and light weight can be removed from the first and second frame bases 37 and 38 and transferred to the third frame base 74, the band U can be readily transferred between the first and second band forming drums 26 and 27 and the tire forming drum 67, even if these drums are not coaxial with each other.

In the above embodiment, the first and second band forming drums 26 and 27 are moved toward and away from the first and second frame bases 37 and 38. In this invention, however, the first and second frame bases 37 and 38 may be moved toward and away from the first and second band forming drums 26 and 27. In the above embodiment, moreover, the spring 60 is used in order to maintain the band grasped by the chuck of the annular member. However, brake means additionally provided on the cylinder may be used instead of the spring.

As can be seen from the above explanation, the invention provides a tire building apparatus which is simple in construction and small-sized and which makes it possible to form bands with high efficiency. Moreover, with two forming drums between which cylindrical members such as belts and tread bands are transferred, even if these forming drums are not coaxial with each other or there is any obstruction between the forming drums, the cylindrical members can be transferred between the drums with high efficiency, keeping the accuracy of the members, notwithstanding the small-sized and simply constructed apparatus according to the invention.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for transferring cylindrical members comprising: a first forming drum and a second forming drum, said first and second forming drums expansible to increase diameters and contractible to decrease the diameters,
   a first frame base movable toward and away from the one forming drum;
   a second frame base movable toward and away from the second forming drum;
   said first and second frame bases moving in a parallel path;
   annular members being able to be placed on said frame bases and having chucks;
   each of said chucks being expansible and contractible by receiving driving power from the frame based upon being placed thereon to grasp a cylindrical tire member on its outside and being able to hold the cylindrical member even upon being removed from the frame base; and
   a transfer mechanism positioned between the first and second frame bases for transferring the annular member holding a cylindrical tire member from the first frame base to the second frame base and for transferring the annular member having no cylindrical tire member from the second frame base to the first frame base.

2. An apparatus for transferring cylindrical members as set forth in claim 1, wherein each of the chucks comprises a cylinder for expanding and contracting the chuck upon receiving the driving power, the cylinder comprises therein a spring for urging a piston and a piston rod in an extending direction.

3. An apparatus for transferring cylindrical members as set forth in claim 1, wherein said transfer mechanism comprises a movable trolley, a transfer assembly arranged on said trolley and a lift assembly to raise and lower said transfer assembly.

4. An apparatus for transferring cylindrical members as set forth in claim 3, wherein each of said transfer assemblies comprises a base plate, center arms movable toward and away from the annular member, driving means for driving the center arms, forward arms movable along the center arms in the same directions as moved directions thereof through distances longer than moved distances of the center arms, grasping pawls supported by the forward arms and grasping pawl driving means for driving the grasping pawls to hold and release the annular member.

5. An apparatus for transferring cylindrical members as set forth in claim 3, wherein each of said lift assemblies comprises eccentric rods eccentrically rotatable about axes positioned spaced from sectional centers of the eccentric rods and eccentric rod driving means for rotatively driving the eccentric rods.

6. An apparatus for building tires comprising:
   a plurality of belt ply supply means for supplying belt plies, respectively;
   first and second tread supply means for supplying treads, respectively;
   first and second band forming drums rotatable and expansible to increase diameters and contractible to decrease diameters;
   a tire forming drum on which a belt-tread band and a green case are combined to form a green tire;
   taking-out means for alternatively removing formed bands from the first and second band forming drums and transferring them to the tire forming drum;
   first moving means for successively moving the first band forming drum to the supply positions of the respective belt ply supply means, a supply position of the first tread supply means and a taking-out position of the taking-out means successively wind belt plies supplied from said belt ply supply means and tread supplied from said first tread supply means one over the other supply positions and to remove a formed band from the first band drum; and
   second moving means for successively moving the second band forming drum to the supply positions of the respective belt ply supply means, a supply position of the second tread supply means and the taking-out position of the taking-out means to successively wind belt plies supplied from said belt ply supply means and a tread supplied from said second tread supply means one over the other around the second band forming drum at the respective supply positions and to remove a formed band from the second band forming drum;
   the apparatus operable so that winding the belt plies and the tread around the first band forming drum and removing the band from the second band forming drum are performed simultaneously, and winding the belt plies and the tread around the second band forming drum and removing the band from the first band forming drum are performed simultaneously;
   said taking-out means comprising first and second frame bases movable toward and away from said first and second band forming drums, respectively, a third frame base movable toward and away from the tire forming drum, two annular members arrangeable on said first, second and third frame bases and having chucks, respectively, each of said chucks being expansible and contractible by receiving driving power from the frame base upon being arranged thereon to grasp a band on its outside and being able to hold the band even upon being removed from the frame base, and transfer mechanism provided between the first, second and third frame bases for transferring the annular member by grasping the band from the first and second frame bases to the third frame base on a tire forming unit and the annular member having no tire member from the third frame base to the first and second frame bases.

7. An apparatus for building tires as set forth in claim 6, wherein each of the chucks comprises a cylinder for expanding and contracting the chuck upon receiving the driving power, the cylinder comprises therein a spring for urging a piston and a piston rod in an extending direction.

8. An apparatus for building tires as set forth in claim 6, wherein said transfer mechanism comprises a movable trolley, a transfer assembly arranged on said trolley and a lift assembly to raise and lower said transfer assembly.

9. An apparatus for building tires as set forth in claim 8, wherein each of said transfer assemblies comprises a base plate, center arms movable toward and away from the annular member, driving means for driving the center arms, forward arms movable along the center arms in the same directions as moved directions thereof through distances longer than moved distances of the center arms, grasping pawls supported by the forward arms and grasping pawl driving means for driving the grasping pawls to hold and release the annular member.

10. An apparatus for building tires as set forth in claim 8, wherein each of said lift assemblies comprises eccentric rods eccentrically rotatable about axes positioned spaced from sectional centers of the eccentric rods and eccentric rod driving means for rotatively driving the eccentric rods.

11. An apparatus for building tires as set forth in claim 6, wherein each of said first and second moving means comprises rodless cylinder and a cylinder.

12. A method of building tires, comprising:
a first step operation of (i) successively transferring a plurality of band forming drums to a plurality of belt ply supply positions for carrying out winding of a belt ply around each band forming drum, (ii) transferring said band forming drums to a plurality of tread supply positions for carrying out winding of a tread around said belt ply which has been would around each of said band forming drums, thereby forming a belt-tread band (BT band), and (iii) subsequently removing the BT band from said band forming drum and engaging the BT band with an annular member;

a second step operation of (i) supplying an empty annular member and receiving an annular member returned in engagement with the BT band while, (ii) supplying another annular member in engagement with the BT band to a green case forming drum and receiving an empty annular member from which the BT band has been removed and transferred to the green case forming drum; and a third step operation of (i) receiving an annular member accommodating the BT band, (ii) transferring the BT band to a center region of a carcass which has been wound around the green case forming drum, and (iii) combining the BT band with the carcass thereby forming a green case;

said method being carried out using a layout comprising a double BT band forming unit in which a first band forming drum and a second band forming drum for performing the first step are connected in series, with center axes of the band forming drums in alignment with each other, a transfer means for performing the second step and transferring the annular members in a direction perpendicular to the axes of the band forming drums, and the green case forming drum for performing the third step, having an axis which is parallel with the axes of the band forming drum, said method further comprising:

starting the first step operation of the first band forming drum and the first step operation of the second band forming drum at different times, for alternately removing the BT bands from the first and second band forming drums;

moving the transfer means between the first and second band forming drums for performing the second step operation so that the BT band which has been alternately removed from one of the first and second band forming drums is received by the annular member and transferred to the green case forming drum, while an empty annular member is returned from the green case forming drum and transferred to another one of the first and second band forming drums; and removing the BT band from the annular member for performing the third step operation wherein the BT band is combined with the carcass on the green case forming drum.

* * * * *